US008135886B2

(12) United States Patent
Li et al.

(10) Patent No.: US 8,135,886 B2
(45) Date of Patent: *Mar. 13, 2012

(54) INSTRUCTION SET FOR PROGRAMMABLE QUEUING

(75) Inventors: Andrew Li, Sunnyvale, CA (US); Michael Lau, Elk Grove, CA (US); Asad Khamisy, Fremont, CA (US)

(73) Assignee: Net Navigation Systems, LLC, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,354

(22) Filed: Feb. 28, 2011

(65) Prior Publication Data

US 2011/0149989 A1  Jun. 23, 2011

Related U.S. Application Data

(63) Continuation of application No. 12/476,206, filed on Jun. 1, 2009, now Pat. No. 7,921,241, which is a continuation of application No. 10/741,132, filed on Dec. 19, 2003, now Pat. No. 7,558,890.

(51) Int. Cl.
*G06F 3/00* (2006.01)

(52) U.S. Cl. .............. 710/52; 710/5; 710/7; 709/250; 370/230.1; 370/415

(58) Field of Classification Search ................ None
See application file for complete search history.

(56) References Cited

U.S. PATENT DOCUMENTS

2004/0088439 A1* 5/2004 Lee et al. ............. 709/250
2005/0232270 A1* 10/2005 Bass et al. ............ 370/389

* cited by examiner

*Primary Examiner* — Eron J Sorrell
(74) *Attorney, Agent, or Firm* — Law Office of Gerald Maliszewski; Gerald Maliszewski

(57) ABSTRACT

A traffic manager includes an execution unit that is responsive to instructions related to queuing of data in memory. The instructions may be provided by a network processor that is programmed to generate such instructions, depending on the data. Examples of such instructions include (1) writing of data units (of fixed size or variable size) without linking to a queue, (2) re-sequencing of the data units relative to one another without moving the data units in memory, and (3) linking the previously-written data units to a queue. The network processor and traffic manager may be implemented in a single chip.

8 Claims, 35 Drawing Sheets

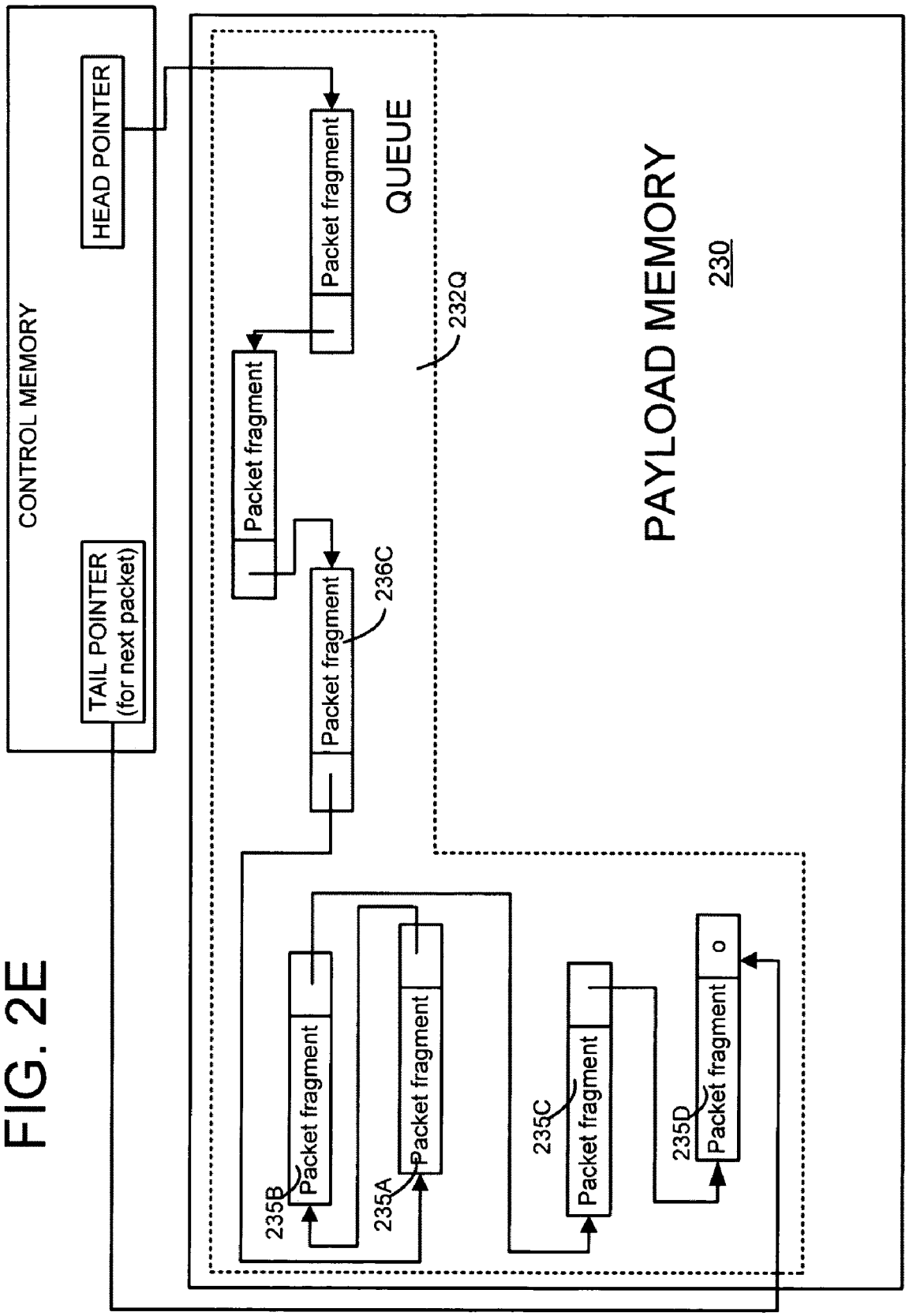

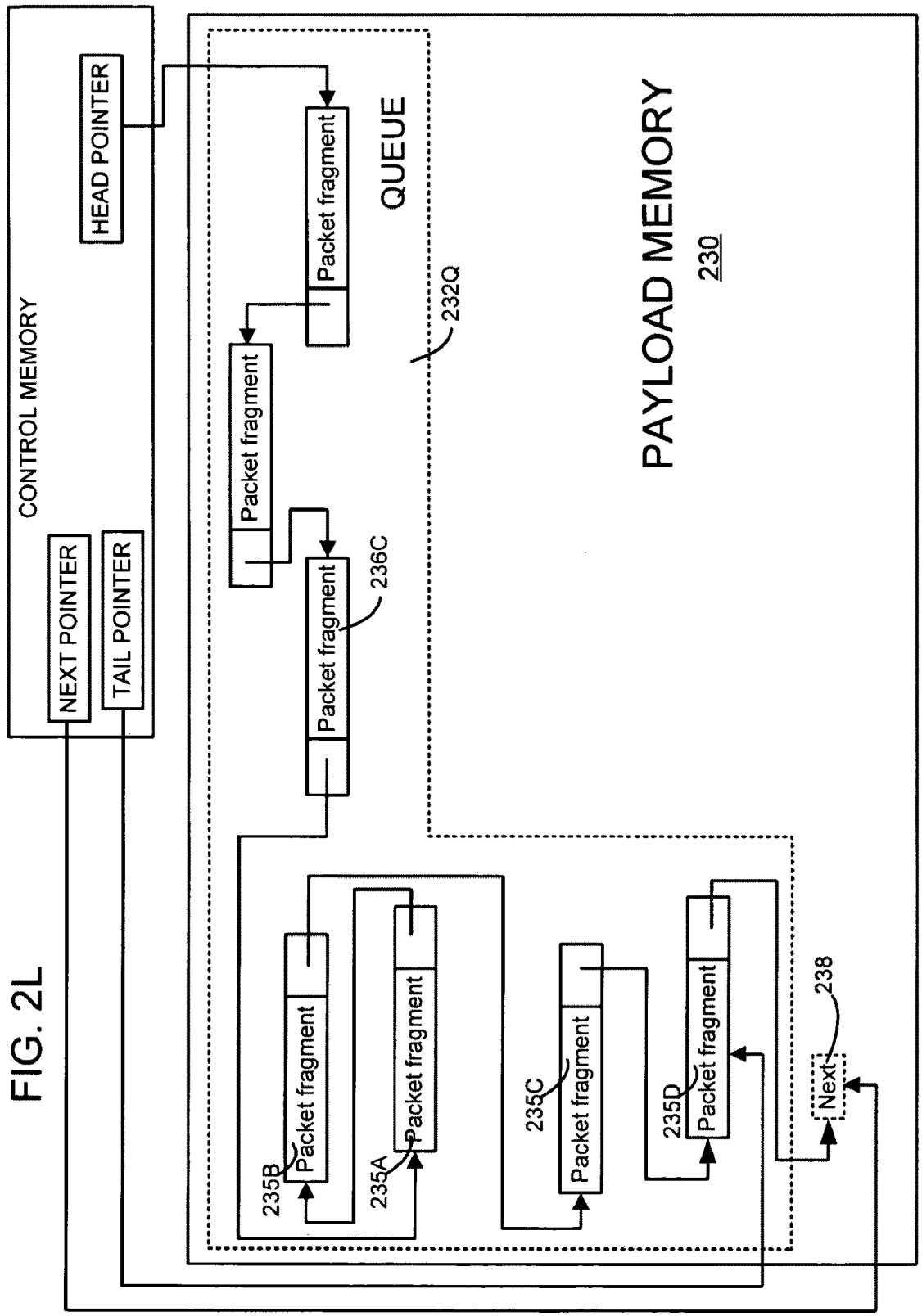

Before the queuing command:

QUEUE tail pointer
QUEUE next pointer

Queuing command: Link Packet data to Queue

Head Pointer = 0x135689
Tail Pointer = 0x145236
Next Pointer = 0x025639

After queuing command is executed:

QUEUE tail pointer
QUEUE next pointer

Before the queuing command:

QUEUE tail pointer    QUEUE next pointer

0x026753 → 0x036538 → 0x127340 → 0x086537 → null

0x135689 → 0x058426 → 0x074258 → 0x145236 → null

Queuing command: Link Existing Data with Null Next Pointer to Queue

EOP indication = 1'b1
Head Pointer = 0x135689
Tail Pointer = 0x145236

After queuing command is executed:    QUEUE tail pointer    QUEUE next pointer 0x026753 → 0x036538 → 0x127340 → 0x086537 → 0x135689 → 0x058426 → 0x074258 → 0x145236 → null

Before the queuing command:

fragment       fragment

Queuing command: Write Data with Head/Next Pointers

Head Pointer = 0x163785
Next Pointer = 0x135689
EOP indication = 1'b0
Data:

between 2 to 3 cells long

After queuing command is executed (assume no drops):

fragment      fragment      fragment

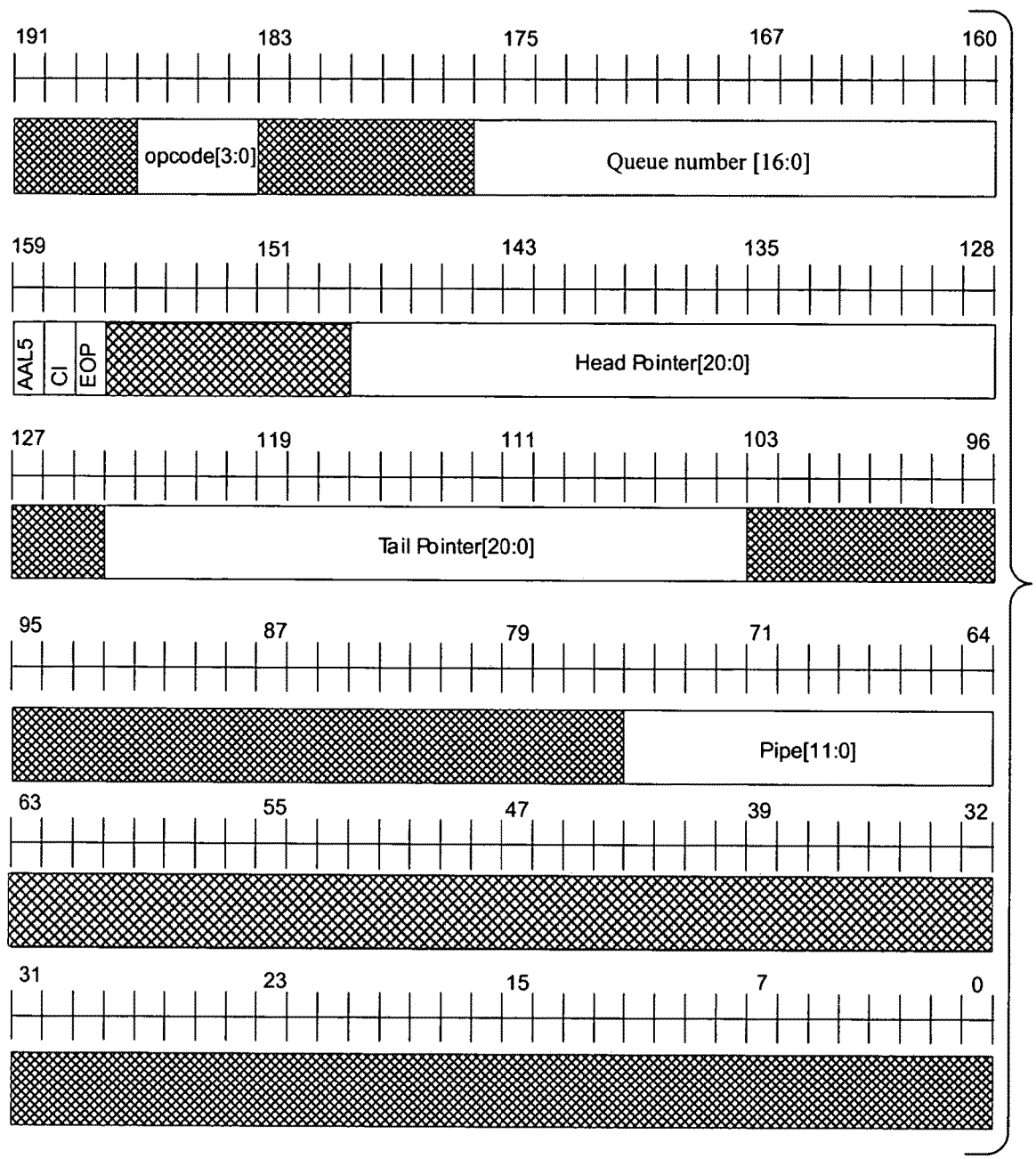

Before the queuing command:

fragment

Queuing command: Write Data with Head/Tail/Next Pointers

Head Pointer = 0x135689
Tail Pointer = 0x153487
Next Pointer = 0x145236
EOP indication = 1'b1
Data:

between 2 to 3 cells long

After queuing command is executed:

Before the queuing command:

Queuing command: MODIFY NEXT CELL POINTER

Cell Pointer = 0x086537
    Next Pointer = 0x135689

After queuing command is executed:

INSTRUCTION SET FOR PROGRAMMABLE QUEUING

CROSS-REFERENCE TO PARENT APPLICATION

This application is a continuation application of U.S. application Ser. No. 12/476,206 filed on. Jun. 1, 2009, now U.S. Pat. No. 7,921,241, by Andrew Li et al. entitled "INSTRUCTION SET FOR PROGRAMMABLE QUEUING" that in turn is a continuation application of U.S. application Ser. No. 10/741,132 filed on Dec. 19, 2003, now U.S. Pat. No. 7,558,890, by Andrew Li et al entitled "INSTRUCTION SET FOR PROGRAMMABLE QUEUING", now issued as U.S. Pat. No. 7,558,890. U.S. application Ser. Nos. 12/476,206 and 10/741,132 are both incorporated by reference herein in their entirety, including all Appendices therein. Specifically Appendix A of U.S. application Ser. No. 10/741,132 is a computer program listing appendix which is expressly incorporated by reference herein in its entirety.

CROSS-REFERENCE TO RELATED APPLICATIONS

This application is related to and incorporates by reference herein in their entirety the following two commonly owned U.S. patent applications that were co-pending with U.S. application Ser. No. 10/741,132 incorporated by reference above.

"Reassembly of Data Fragments in Fixed Size Buffers" filed as U.S. patent application Ser. No. 10/211,098 filed Aug. 1, 2002 by Dayne A. Reast, Benjamin Hur and Sangyu Wang.

"Reassembly of Out-of-order Data Fragments In a Network" filed as U.S. patent application Ser. No. 10/211,080 filed Aug. 1, 2002 by Ari Birger, Dayne A. Reast, Benjamin Hur.

CROSS-REFERENCE TO COMPUTER PROGRAM LISTING APPENDIX

Appendix A contains the following file submitted electronically, in IBM-PC format and compatible with Microsoft Windows. Appendix A is a part of the present disclosure and is incorporated by reference herein in its entirety.

| | | |
|---|---|---|
| Dec. 19, 2003 | 12:08 p | 116,554 PIPE.TXT |
| | 1 File(s) | 116,554 bytes |
| | 0 Dir(s) | 0 bytes free |

The file of Appendix A forms source code of a computer program (in the form of hardware description language, Verilog) for implementing certain circuitry used in an illustrative embodiment of the present invention, containing an instruction pipeline in an execution unit as illustrated in FIGS. 3A and 3B and described below. The code in Appendix A is in Verilog and provides a behavioral description of the pipeline used in one specific illustrative embodiment.

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

BACKGROUND

Network processors (also called communications processors) of the prior art may perform one or more of the following functions (called "network processing functions"): parsing, searching, resolving and modifying. During parsing, a network processor analyzes and classifies the contents of the header and fields. During searching, tables are searched for a match between the content that was classified and pre-defined content and rules. During resolving, the destination and quality of service (QoS) requirements are resolved and the packet/cell is routed to its destination. During modifying, where necessary, the packet/cell is modified, e.g. certain fields (such as time to live and checksum) within the packet/cell are changed. Examples of commercially available network processors include: Intel's IXP1200, Agere's Payload Plus, AMCC's nP7250, IBM's PowerNP NP4GS3, Motorola's C-Port C-5 and Vitesse's IQ2000.

A network processor of the type described above is typically coupled to and used with a traffic manager and/or a switch fabric. Either or both devices (traffic manager and/or switch fabric) may perform one or more of the following functions: queuing and output scheduling (round robin, weighted fair queuing), policing of traffic flows to assure quality of service, traffic shaping (e.g. to meet delay or jitter requirements), statistics collection, congestion management and provisioning. Examples of commercially available devices that perform switch fabric functions include: Motorola's Q5 TMC, and AMCC's nPX5710/nPX5720 (together referred to as nPX5700).

For traffic management as well as for switching, each packet/cell must be stored in memory and later transmitted. The above-described functions may be implemented together in a chipset consisting of two chips: a traffic manager (such as AMCC's nPX5710) and a memory manager (such as AMCC's nPX5720). The just-described two chips are normally used together and each may have four ports, each port being coupled to a network processor by serial links operating at 2.5 Gbps or 10 Gbps.

Buffering of traffic is typically implemented via an external memory attached to the memory manager (which is also called a "switch fabric"). Typical requirements in today's networks may require traffic up to two hundred and fifty six thousand (256K) queues to be managed. In some implementations, at any given time, only information related to a subset of these queues (e.g. up to eight thousand queues) may be cached on chip (e.g. in DDR SDRAM or RDRAM) by taking advantage of statistical multiplexing (i.e. the likelihood that the incoming traffic belongs to more than eight thousand queues is very low). Therefore, eight thousand queues (containing packets/cells) are stored in a buffering chip (such as AMCC's nPX5720) having embedded DRAM channels for example, and these queues are managed by a control logic chip (such as AMCC's nPX5710). These two chips when used together act as a switch fabric and traffic manager.

A prior art network processor 110 may be used with a prior art traffic manager 120 as illustrated in FIG. 1. Traffic manager 120 is coupled to an external memory 130 that temporarily holds packet fragments in queues. Note that each packet fragment (of variable length) may itself be divided up into one or more cells (of fixed length). Traffic manager 120 typically contains a queue manager 121 which (in certain prior art known to the inventors) is hardwired to automatically write and link each packet fragment or cell sent by network processor 110 to a queue identified by network processor 110 on a bus 116 (FIG. 1). Network processor 110 includes a processing unit 111 that identifies a queue number for each packet fragment or cell, based on a header of the packet fragment. Incoming packet fragments are temporarily stored in an ingress FIFO memory 112 inside network processor 110 while awaiting processing by processing unit 111.

Such a queue manager 121 of the prior art traffic manager 120 does not (to the inventors' knowledge) perform any actions on a packet fragment (or cell) when being stored in memory 130, other than to write and link the fragment (or cell) directly into a queue in a single unitary operation (that is uninterruptible). Specifically, the inventors know of no instruction or command that can be issued to a prior art queue manager 121 to reassemble out-of-order fragments (or cells). Instead, a queue manager 121 of the prior art simply accepts packet fragments (or cells) without any explicit instruction, and automatically adds them to the identified queue.

The packet fragments which are stored in queues in external memory 130 are processed for transfer therefrom by a scheduler 122 that is included in prior art traffic manager 120. Scheduler 122 of the prior art may schedule transfer of packet fragments from each queue based on a number of criteria, for example, priority and/or rate (shaping and limiting), minimum bandwidth guarantee and maximum bandwidth limit, and any other quality of service (QOS) parameters known in the prior art. Scheduler 122 may implement, for example, a weighted round robin (WRR) mechanism, to schedule the queues for data transfer therefrom.

At an appropriate time (as determined by scheduler 122), the packet fragments in a queue are transferred to network processor 110 (or to another network processor). Processing unit 111 forwards the packet fragments towards their destination. Note that re-ordering of packet fragments and reassembly of a packet is performed in another device (not shown) which is located down stream of network processor 110.

Incorporated by reference herein in their entirety are the following references:

"A Fully-Programmable Memory Management System Optimizing Queue Handling at Multi Gigabit Rates" by G. Kornaros, I. Papaefasthathiou, A. Nikologiannis and N. Zervos, pages 54-59 published at DAC 2003, Jun. 2-6, 2003, Anaheim, Calif.;

U.S. Pat. No. 6,307,860 granted to Joffe, et al. on Oct. 23, 2001, and entitled "Systems and methods for data transformation and transfer in networks";

U.S. Pat. No. 6,330,584 granted to Joffe, et al. on Dec. 11, 2001, and entitled "Systems and methods for multi-tasking, resource sharing and execution of computer instructions";

U.S. Pat. No. 5,901,147 granted to Joffe on May 4, 1999, and entitled "Apparatus and methods to change thresholds to control congestion in ATM switches"; and U.S. Pat. No. 6,128,278 granted to Joffe, et al. on Oct. 3, 2000 and entitled "Cell queuing in ATM switches."

SUMMARY

In accordance with the invention, a queuing device in a traffic manager is made programmable. Specifically, a traffic manager of several embodiments of the invention includes an execution unit that is responsive to instructions related to queuing of data in memory (also called "payload memory"). The instructions may be issued to such an execution unit with or without a unit of data on which each instruction is to be executed, depending on the embodiment. Each instruction in accordance with the invention includes an operation code (commonly called "opcode") that uniquely identifies an action to be performed, such as storage of data, setting up a sequence for reading the data, and association of the data to a queue.

Examples of instructions that are executed by an execution unit of several traffic managers in some embodiments of the invention include (1) writing of data units (of fixed size or variable size), (2) re-ordering of the data units relative to one another without moving the data units from one region of the memory to another, and (3) linking the re-ordered data units to a queue, for eventual use by a scheduler. The just-described instructions in accordance with the invention support the reordering of out-of-order data even after storage of the data. Such reordering is possible because instructions in accordance with the invention are of finer resolution than prior art queuing commands, such as "enqueue" and "dequeue."

Instructions to a traffic manager in accordance with the invention may be supplied by a network processor that is appropriately programmed (to generate such instructions, depending on the data). In most cases, the instructions are issued with (e.g. pre-pended to) units of data on which the instructions are to be performed. However, in some cases, instructions are issued without any data unit if the instructions are to be performed on data units that are already previously stored in memory.

In some embodiments, units of data that are stored in the queues are of fixed size ("cells") that are themselves fragments of: larger units of data ("packets") of variable size that are normally transmitted through a communication network, such as the Internet.

BRIEF DESCRIPTION OF THE FIGURES

FIGS. 2C, 2D and 2E illustrate, in block diagrams of memory, an example of processing of packet fragments by the methods of FIG. 2B, wherein all received packet fragments are stored in memory on receipt, followed by organization of the packet fragments into a predetermined order (if received out-of-order) in a linked list, followed by linking of the linked list to a queue to which the packet fragments belong. Note that the "o" at the end of a packet fragment in FIGS. 2C-2E indicates a pointer that is set to null.

FIGS. 2G, 2H, 2I, 2J, 2K and 2L illustrate, in block diagrams of memory, an example of processing of packet fragments by the methods of FIG. 2F, wherein at the time each received packet fragment is being stored in memory the fragment is coupled (if possible) to an adjacent fragment in the predetermined order to form two or more linked lists (each list having at least one entry), followed by coupling of the linked lists to one another thereby to couple all received packet fragments in the predetermined order, followed by linking of the resulting list to a queue to which the packet fragments belong.

FIGS. 8A and 8B illustrate the format and exemplary use respectively of another write instruction in the just-described instruction set.

DETAILED DESCRIPTION OF SEVERAL EMBODIMENTS OF THE INVENTION

Figure 1:
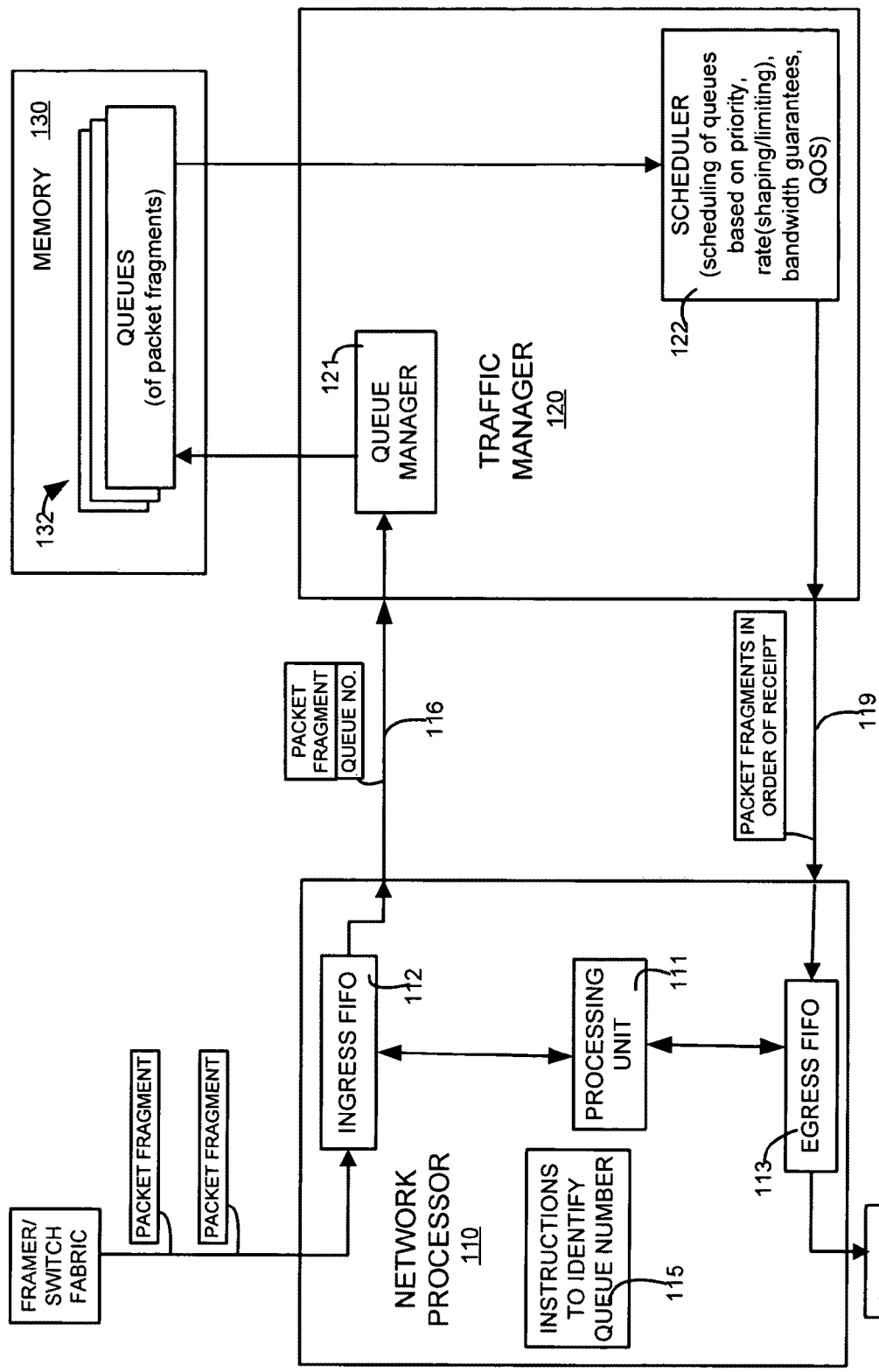
FIG. 1 illustrates in a high level block diagram, a prior art network processor 110 coupled to a prior art traffic manager 120 having a queue manager that is hardwired to automatically store packet fragments directly in one of queues 132 in memory 130.

A traffic manager in accordance with the invention is made programmable by inclusion of an execution unit that decodes and executes instructions of a predetermined instruction set. The predetermined instruction set includes an operation code ("opcode") to "write" a unit of data (such as a fragment of a packet), and/or "stitch" previously stored units of data in a specified order (appropriate for re-assembly of the packet), and/or "link" the stitched data units to a queue (thereby to elongate the queue).

A traffic manager 220 (FIG. 2A) in many embodiments of the invention includes an execution unit 221 to decode and execute opcodes of the type described above. Specifically, in response to a write instruction, execution unit 221 (FIG. 2A) stores a packet fragment in memory 230, but does not (at the time of storing) link the packet fragment to one of queues 232 (also in memory 230). Instead, each packet fragment is stored in memory 230 without enqueuing the fragment (shown as one of fragments 231 in FIG. 2A). Storage of packet fragments using instructions of such an instruction set allows the packet fragments to be re-ordered as discussed next.

In response to a stitch instruction, execution unit 221 (FIG. 2A) sets up a specific order in which packet fragments 231 are eventually read from memory 230. Specifically, packet fragments 231 are coupled to one another during the stitch instruction in a specific sequence that may (or may not) be different from a sequence in which the fragments are initially received by execution unit 221. For example, if packet fragments 231 arrive out of order and have been stored in memory 230, then they may be rearranged to be in order by network processor 210 issuing one or more stitch instructions. In several embodiments, the stitch instruction is implemented by execution unit 221 without moving packet fragments 231 in memory 230 (e.g. if the fragments were received out of order then they are reordered simply by changing pointers to the fragments). The pointers themselves may be stored in memory 230 or in another memory, depending on the embodiment. Elimination of moving of data in memory 230 improves the speed of execution of the stitch instruction.

Rearrangement of packet fragments by execution unit 221 eliminates the need for network processor 210 to have memory to temporarily hold the packet fragments while being rearranged, or alternatively the need for additional circuitry for rearrangement. Furthermore, in response to a link instruction, execution unit 221 adds packet fragments held in memory 230 to one of the queues 232 (i.e. the fragments that are now in order are enqueued). Use of a common memory 230 to hold packet fragments 231 as well as queues 232 enables several embodiments to implement the link instruction without moving the fragments in memory 230 and removes the need for a separate memory used for reassembly. Elimination of moves in memory 230 improves the speed of execution of the link instruction.

Figure 2A:
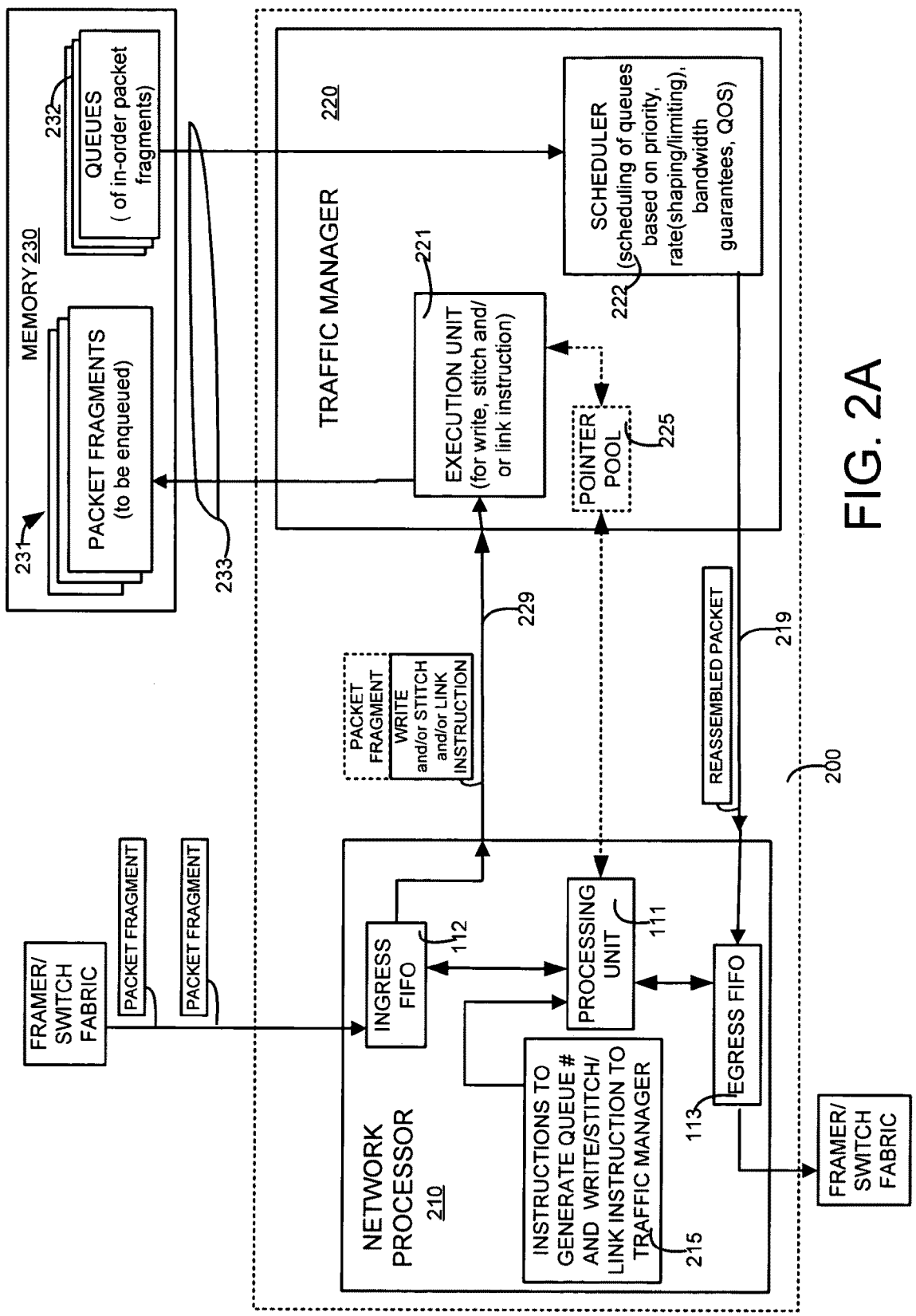
FIG. 2A illustrates, in a high-level block diagram, a network processor 210 coupled to a traffic manager 220 that has been made programmable in accordance with the invention. Many of the reference numerals used in FIG. 2A are obtained by adding 100 to the corresponding reference numerals in FIG. 1.

Traffic manager 220 of the embodiments illustrated in FIG. 2A also includes a scheduler 222 (which is identical or similar to prior art scheduler 122) to process the data held in queues 232. As noted above in the Background section, such a scheduler 222 may schedule transfer of packet fragments from each of queues 232 based on a number of criteria, for example, priority and/or rate (shaping and limiting), minimum bandwidth guarantee and maximum bandwidth limit, and any other quality of service (QOS) parameters known in the prior art. Note that in many embodiments, data is dequeued from one of queues 232 in memory 230 only in response to a request from scheduler 222.

In some embodiments, the structure of queues 232 (FIG. 2A) in memory 230 is also identical (or similar) to the prior art queues 132 (FIG. 1). However, the data stored in queues 232 by execution unit 221 differs from the data held in prior art queues 132 in at least one important respect: the data in queues 232 is in a predetermined order that is appropriate for reassembly of a packet, for example if the data was initially received out of order (on an input bus 229) it is rearranged to be in order. A re-arrangement of data is performed by execution unit 221 of traffic manager 220 in response to the above-described "stitch" instruction, to set up the order of the packet fragments (e.g. by changing pointers to packet fragments 231 in memory 230). Therefore, the data that is supplied by scheduler 222 on output bus 219 (FIG. 2A) has a predetermined order (which is the original order of a packet as specified in the header of multiple packet fragments that form the packet).

Moreover, scheduler 222 (or other such logic) of some embodiments supplies the data from each queue in memory 230 in a contiguous manner to the network processor 210.

Specifically, in some embodiments, there is no intervening data between multiple successive fragments (or cells) of a packet on output bus 219. For this reason, the data being supplied on bus 210 forms a reassembled packet. Some embodiments of scheduler 222 (or other such device) inform the network processor 210 regarding the presence or absence of valid data on bus 219, e.g. by driving an enable signal on bus 219. Therefore, there is no need for a network processor 210 that is reading data from bus 219 to remove padding or other such bytes to form the reassembled packet.

In contrast, as noted in the Background section, the data held in prior art queues 132 is stored in the order of receipt, and hence the data is supplied to output bus 119 (FIG. 1) in the received order by prior art scheduler 122. Note that the lines of output bus 119 of prior art FIG. 1 may be similar or identical to the corresponding lines of output bus 219 of a traffic manager 220 in accordance with the invention (FIG. 2A)

Scheduler 222 and execution unit 221 (FIG. 2A) of traffic manager 220 in accordance with the invention can both be coupled (i.e. they are both couplable) to memory (also called "payload memory") 230 via a bus 233 (called "memory bus"). Memory bus 233 (FIG. 2A) is coupled to execution unit 221, to receive information (such as packet fragments and/or pointers) that are to be stored in memory 230. Moreover, memory bus 233 is coupled to scheduler 122 to supply in-order packet fragments being held in queues 232 in memory 230.

Also, the above-described "write", "stitch" and "link" instructions are issued to execution unit 221 of traffic manager 220 (FIG. 2A) on a bus 229 (also called "input bus") that is coupled to a network processor 210 or other such circuitry that can issue instructions. Specifically, network processor 210 drives on to the input bus 229 a signal (in the form of an electromagnetic waveform) which carries an instruction of the above-described instruction set. In the case of a write instruction, the signal on the input bus 229 also carries the data to be written (i.e. a packet fragment).

In several such embodiments, traffic manager 220, input bus 229, and network processor 210 are all formed in a single integrated circuit (IC) die 200 (shown by a dashed line in FIG. 2A), although in other embodiments traffic manager 220 and network processor 210 are each formed in their own individual IC dies. Note that in many single IC die embodiments, the signal that travels between the network processor 210 and the traffic manager 220 is located wholly inside IC die 200, because input bus 229 on which the signal travels is wholly contained in the IC die.

Several embodiments write all received packet fragments in memory 230 without coupling each packet fragment to an adjacent packet fragment, until all packet fragments (that form a packet) have been received. After receipt of all packet fragments, they are coupled to one another to form a singly linked list (in this embodiment), and arranged in the predetermined order that is appropriate for reassembly of the packet. Thereafter the singly linked list is enqueued.

Figure 2B:
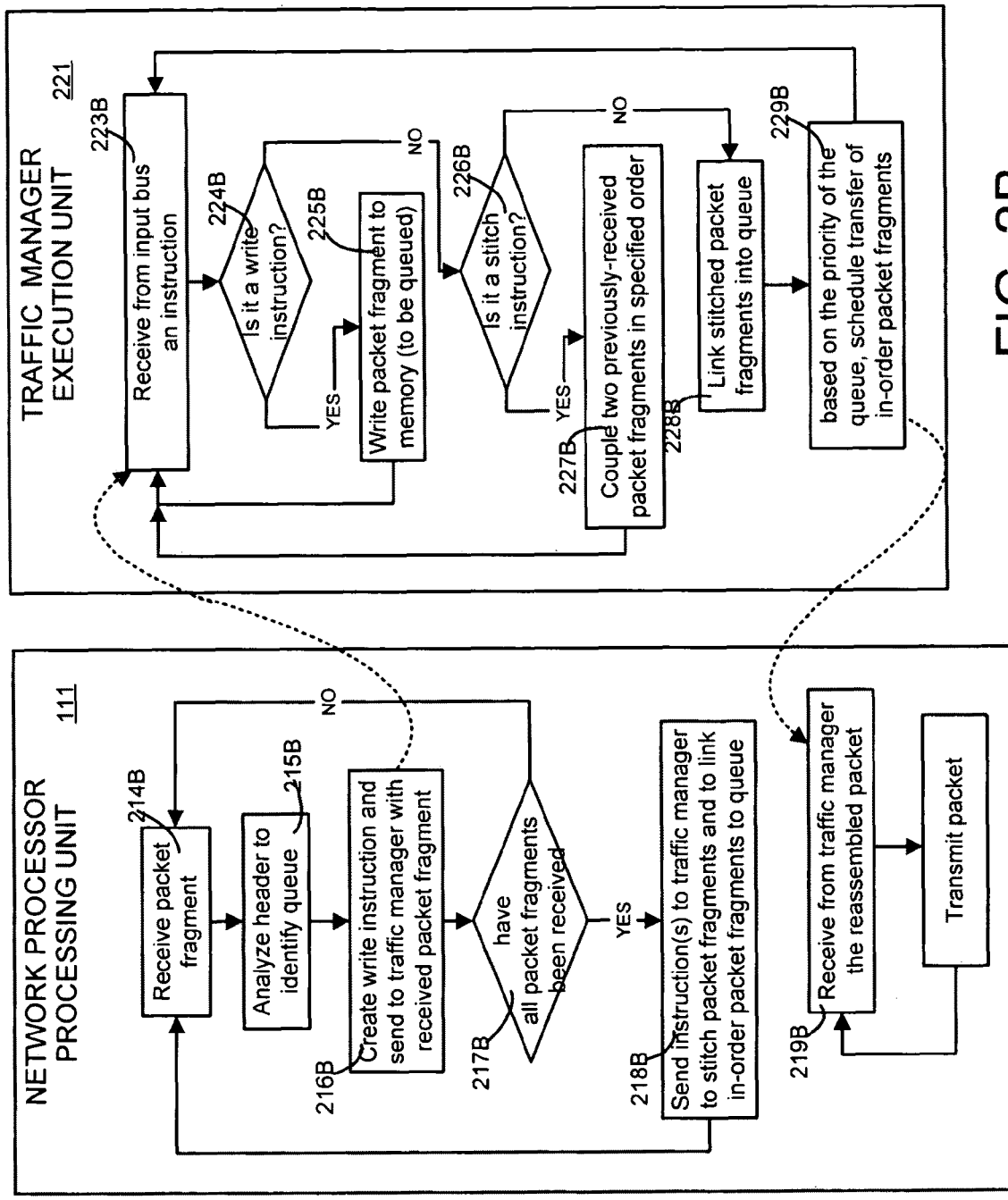
FIG. 2B illustrates, in a flow chart, acts performed in some embodiments of the invention by a processing unit in the network processor 210 of FIG. 2A to send instructions to traffic manager 220 of FIG. 2A for storage of data in memory 230, and acts performed by an execution unit in traffic manager 220 to interprets the instructions from network processor 210.

In many such embodiments, network processor 210 includes a processing unit 111 that receives packet fragments with a header from an external source such as a framer or a switch fabric depending on the embodiment (see act 214B in FIG. 2B). Network processor's processing unit 111 is programmed by instructions 215 (FIG. 2A) to analyze the received header (as per act 215B in FIG. 2B) to identify a queue number. The queue number is identified in the normal manner, e.g. by lookup of a classification table (which relates a field of a header, such as the IP address to a queue).

Processing unit 111 of the network processor 210 is also programmed in accordance with the invention, by such instructions 215 (FIG. 2A), to create a write instruction for each packet fragment, followed by transmission of the write instruction on input bus 229 (as per act 216B in FIG. 2B). Note that in addition to the write instruction, the packet fragment and the queue number are also transmitted on bus 229.

Processing unit 111 repeatedly performs the receiving, analyzing, creating and sending operations described above, until all fragments of a packet are received (as per act 217B). When all packet fragments of a given packet have been received, processing unit 111 is programmed (by instructions 215) to create and send to traffic manager 220 a stitch instruction and/or a link instruction (as per act 218B in FIG. 2B).

In some embodiments, execution unit 221 of traffic manager 220 performs the following acts which are illustrated in FIG. 2B. Specifically, in act 223B, execution unit 221 receives an instruction from the input bus (and in addition the execution unit 221 may also receive a queue number, and a packet fragment). Thereafter, in act 224B, execution unit 221 checks if the instruction that was received was a write instruction (i.e. decoding the instruction that has been received). Next, in act 225B, execution unit 221 executing the write instruction, by storing the received packet fragment in memory 230, without linking the packet fragment to a queue. The just-described actions 223B, 224B and 225B may be performed repeatedly, in response to a corresponding number of write instructions, e.g. until all packet fragments that constitute an internet packet (IP) are received.

Thereafter, execution unit 221 receives a stitch instruction (in act 223B), and decodes the stitch instruction (as per act 226B) to find that act 227B is to be performed. Thereafter, execution unit 221 executes the stitch instruction, to couple to one another two previously received packet fragments 231 that are currently existing in memory 230. In executing the stitch instruction in act 227B, the execution unit 221 stores at least one pointer in the memory. In some embodiments, a next pointer for each packet fragment is updated to point to the beginning of the next packet fragment (except for the last packet fragment whose next pointer is set to null).

At some later time, execution unit 221 of these embodiments receives a link instruction (in act 223B), decodes the link instruction (as per act 228B) to find that act 229B is to be performed and executes the link instruction (as per act 229B). On execution of the link instruction, execution unit 221 couples all fragments of a packet (which have been stitched into the appropriate order) to a queue that was identified by a queue number in the write instruction.

The reassembly method of FIG. 2B is now illustrated with an example in which four packet fragments 235A-235D (FIG. 2C) are received out of order. Specifically, a predetermined order for use in forming a packet is as follows: fragment 235A, fragment 235B, fragment 235C and fragment 235D. However, the fragments are received in the following order: fragment 235D, fragment 235C, fragment 235A and fragment 235B. On performance of the method illustrated in FIG. 2B, all fragments 235A-235D are individually written, one at a time to payload memory 230. Note that fragments 235A-235D are not linked to one another (i.e. their next pointers are set to null). At this stage, fragments 235A-235D are also not linked to their queue 232Q which is also present in memory 230 (although this particular queue was identified in the write command by which the fragments were stored in memory 230).

As noted above, in several embodiments, each packet fragment has associated therewith a "next" pointer which is to be used to identify the next fragment in the predetermined order.

Figure 2C:
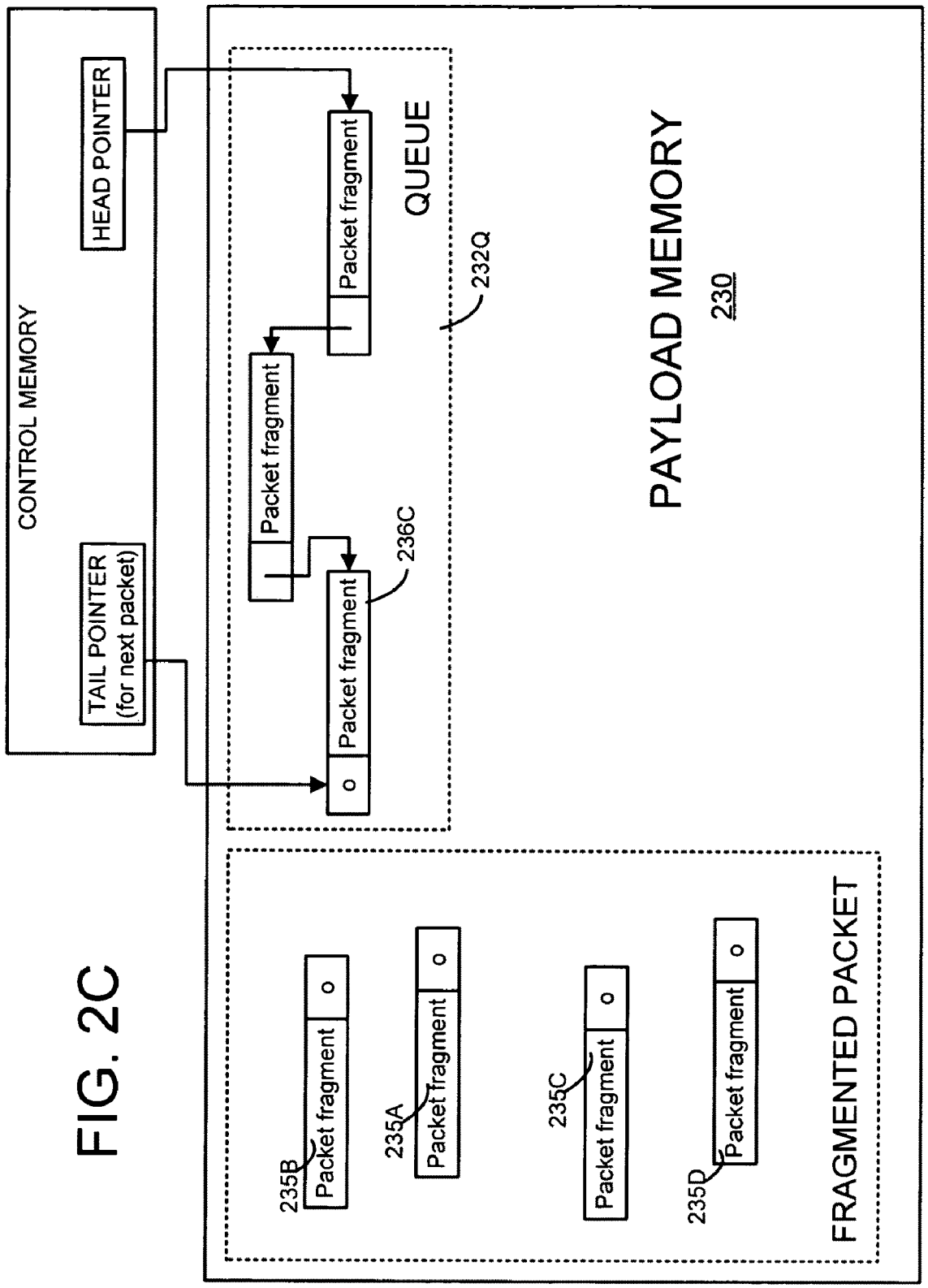

However, at the stage illustrated in FIG. 2C, act 225B has been repeatedly performed, but stitching act 227B (FIG. 2B) is yet to be performed. It is for this reason that all the next pointers of fragments 235A-235D are currently null.

Figure 2D:
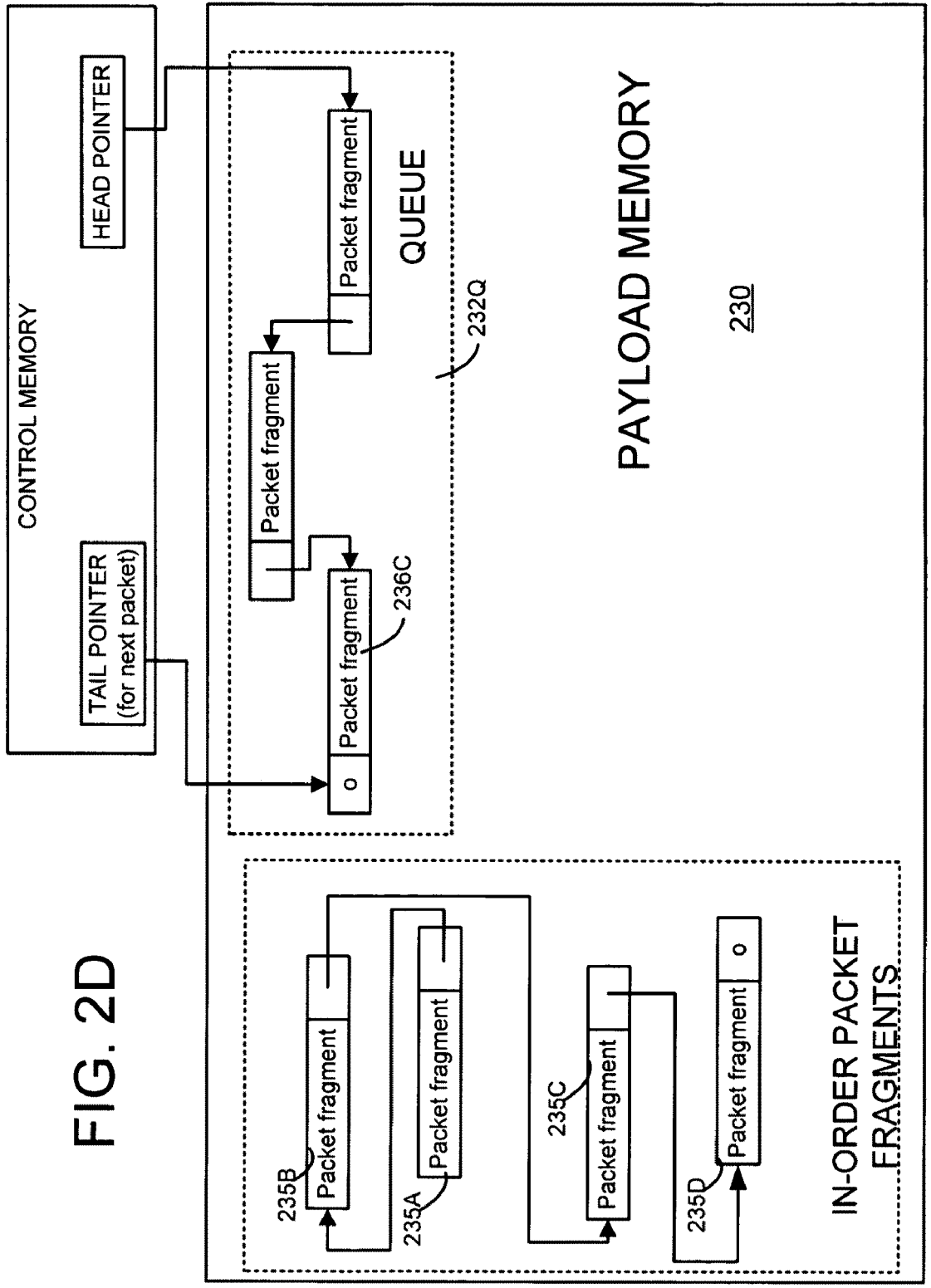

After all fragments 235A-235D of a packet are received, the stitching act 227B is performed repeatedly (by network processor 210), with the result shown in FIG. 2D. Note that on completion of the repeated stitching, the fragments are all appropriately coupled to one another, with fragment 235A having its next pointer pointing to fragment 235B, fragment 235B having its next pointer pointing to fragment 235C, fragment 235C having its next pointer pointing to fragment 235D.

In order to appropriately perform the stitching in act 227B, network processor 210 of these embodiments maintains (in a database which is not shown), the specific location at which each packet fragment has been stored in memory 230 (e.g. the start address and the last address), a reassembly state (e.g. whether the first fragment and/or the last fragment have been stored in payload memory) and also a sequence number from the header of the packet fragment. The specific programming to generate multiple stitch instructions for execution by traffic manager 220, based on each fragment's sequence number and location in memory, will be apparent to the skilled programmer in view of this disclosure.

Next, the linking act 229B is performed with the result shown in FIG. 2E. Specifically, the "next" pointer of the last packet fragment 236C in queue 232Q is set to the address of the first packet fragment, namely fragment 235A. Moreover, the "next" pointer of the last packet fragment 235D is set to null. Furthermore, in the embodiments illustrated in FIGS. 2C-2E, a "tail" pointer in a descriptor of queue 232Q is updated to point to the last fragment 235D.

Note that acts 224B and 226B shown in FIG. 2C and any additional similar acts of checking are merely illustrative of the methods being described herein, and it is to be understood that such acts may be performed simultaneously with one another in hardware, e.g. by a decode logic (which may be implemented as combinational logic that is responsive to the specific bit patterns that constitute the opcodes to be decoded).

Figure 2F:
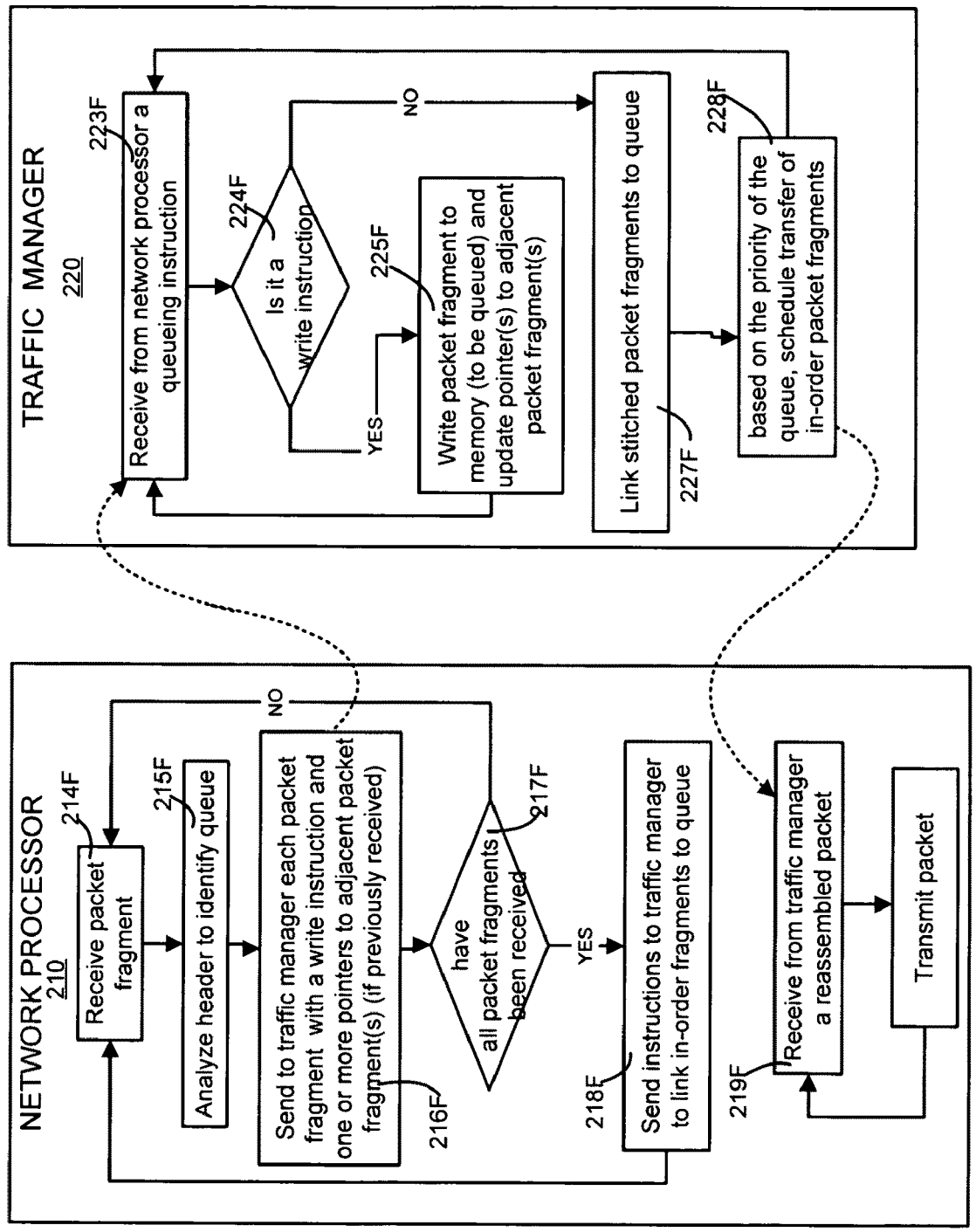
FIG. 2F illustrates, in a flow chart, acts performed in some other embodiments of the invention by a processing unit in the network processor 210 of FIG. 2A to send instructions to traffic manager 220 of FIG. 2A for storage of data in memory 230, and acts performed by an execution unit 221 in traffic manager 220 to interpret the instructions from network processor 210.

In certain alternative embodiments, execution unit 221 of traffic manager 220 does not perform the reassembly method illustrated in FIG. 2B and instead performs the reassembly method illustrated in FIG. 2F. The difference between these two methods is summarized as follows: the method of FIG. 2B performs all stitching at the very end, i.e. after all packet fragments have been received whereas the method of FIG. 2F performs at least some stitching prior to the complete receipt of all packet fragments. Specifically, as illustrated in FIG. 2F, acts 214B and 215B are performed as described above in reference to FIG. 2B, followed by act 216F.

Figure 2G:
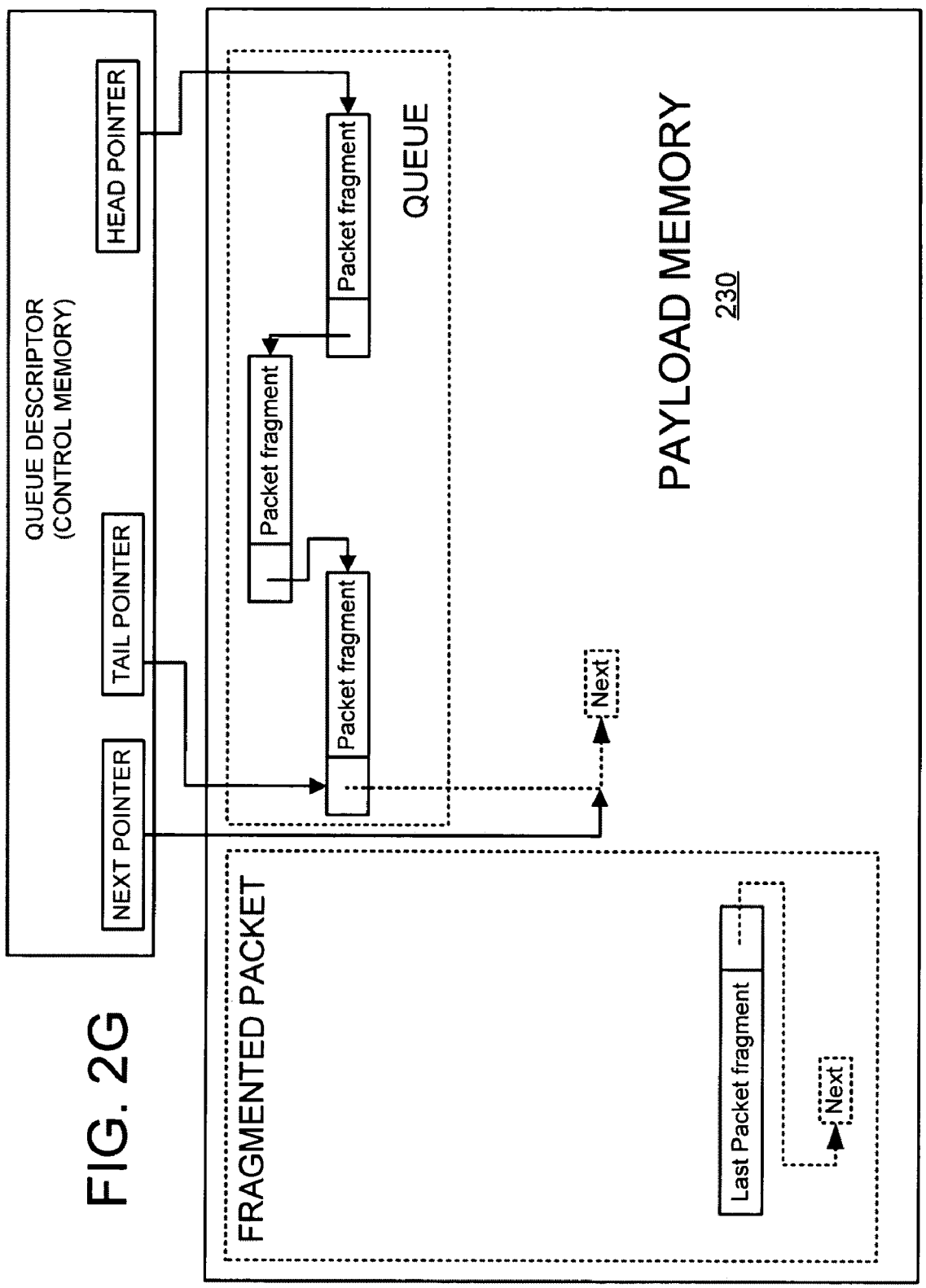
Figure 2H:
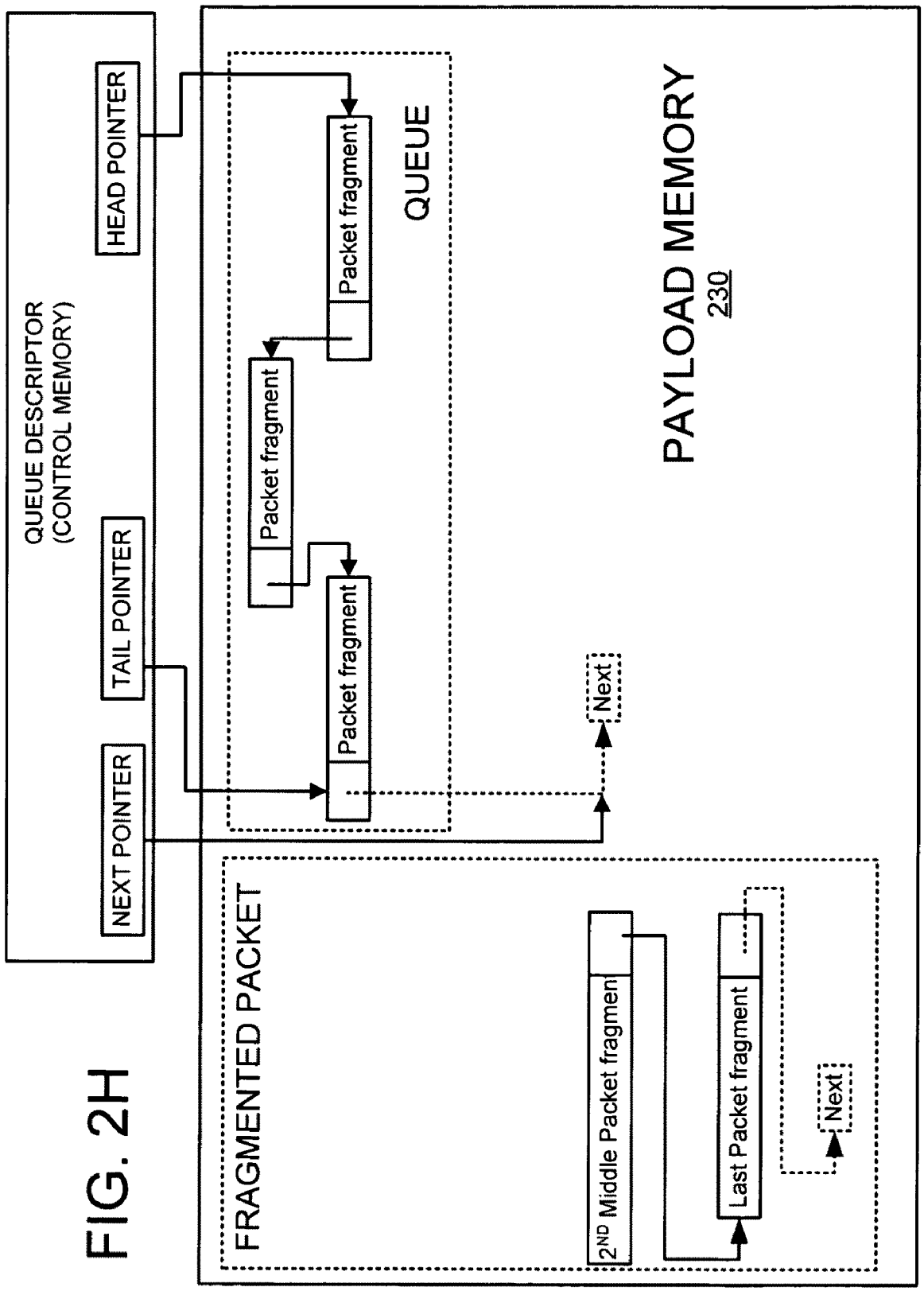
Figure 2I:
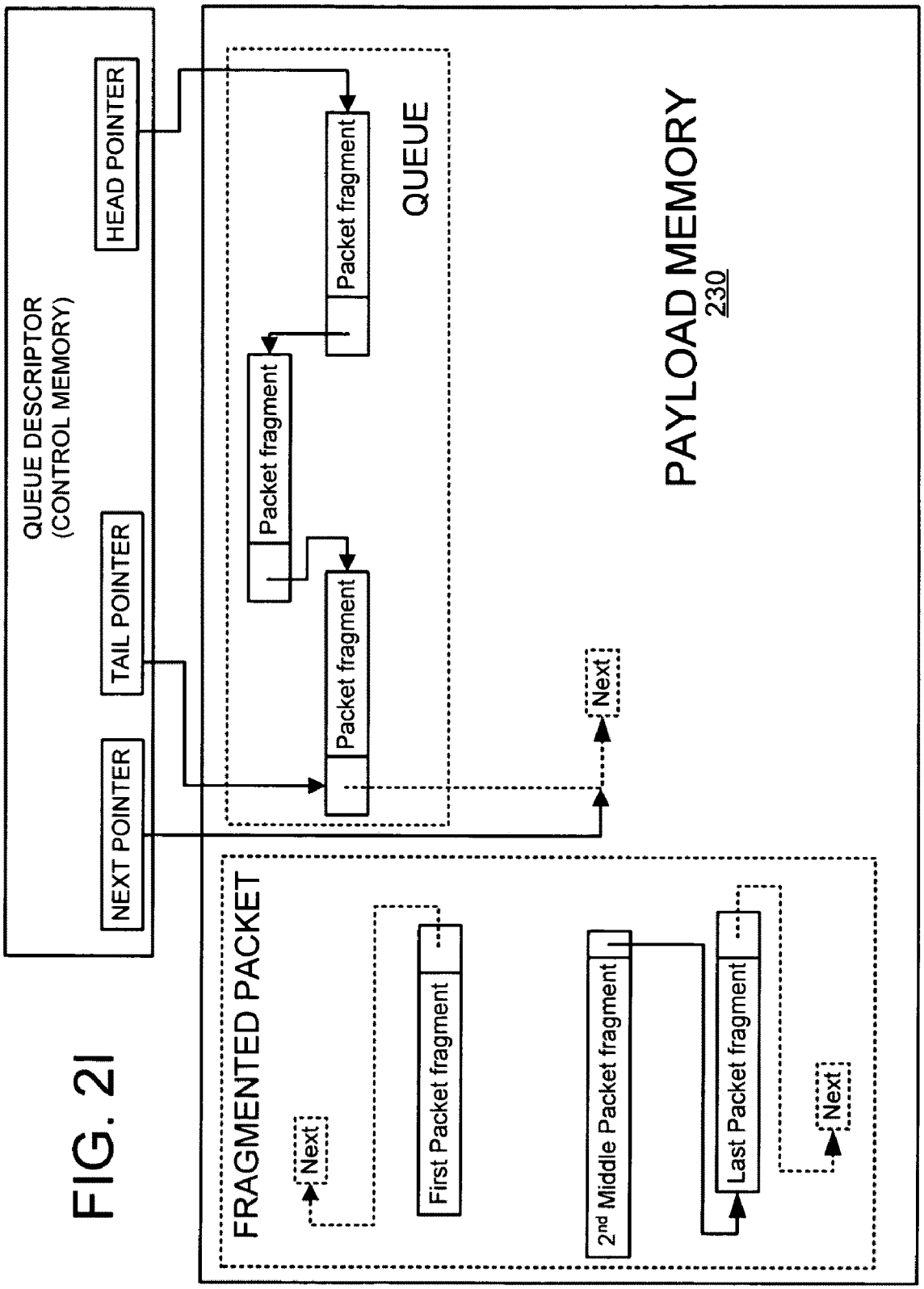

In act 216F, the processing unit 111 is programmed to send to the traffic manager 220 not only the write instruction but also a start address at which the current packet fragment is to be stored. In some embodiments, the just-described start address is selected to be identical to an address in the "next" pointer of a previously-received packet fragment that precedes the current packet fragment in the predetermined order. For example, if the current packet fragment is the second fragment, and if the first fragment is already received (as shown in FIG. 2I), then the address to which the next pointer of fragment 235A points is used as the start address for writing fragment 235B. In these embodiments, if a number of packet fragments are received in the same sequence as the predetermined order, then they are automatically stitched simply by execution of the write instruction in act 225F (FIG. 2F). Such stitching in act 225F is also referred to as "on-the-fly" stitching or "implicit" stitching, which is in contrast to an explicit use of the stitch command in act 227B (FIG. 2B).

Also, if packet fragments that are adjacent to one another are received in the reverse of the predetermined order (as specified by a sequence number in a packet fragment's header), then as a parameter of each write instruction to store the fragment, the "next" pointer of the fragment that is earlier in the predetermined order is specified. For example, if packet fragment 235D is received, followed by receipt of packet fragment 235C (as shown in FIGS. 2G and 2H), then the "next" pointer of fragment 235C may be set to point to the beginning of fragment 235D during execution of the write instruction in act 225F (FIG. 2F). Therefore, although the update of "next" pointer for some embodiments is performed by execution unit 221 in executing the write instruction in act 225F (FIG. 2F), such update may also be performed by execution of (and in response to) an explicit stitch instruction prior to act 227F (discussed next).

Figure 2J:
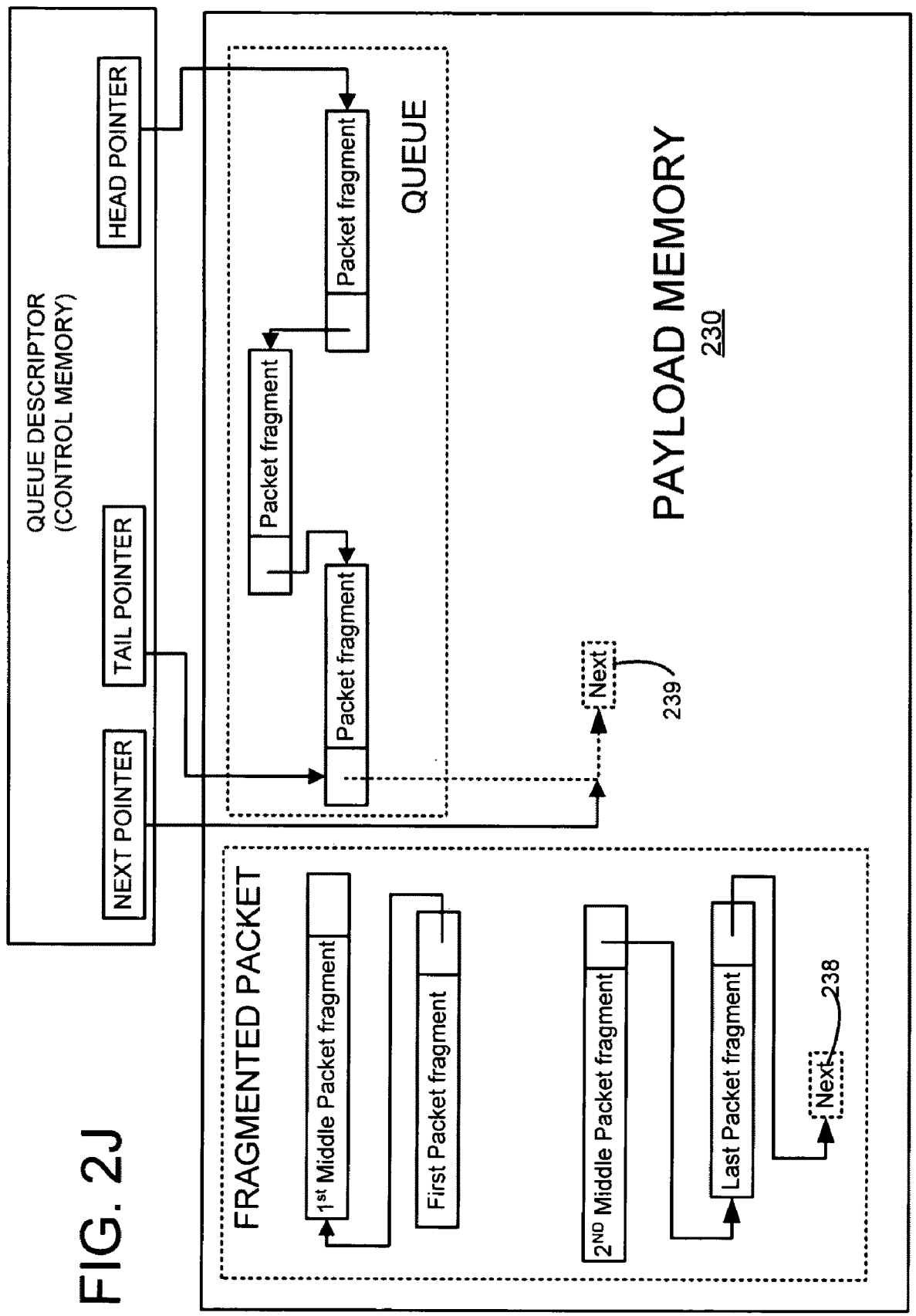
Figure 2K:
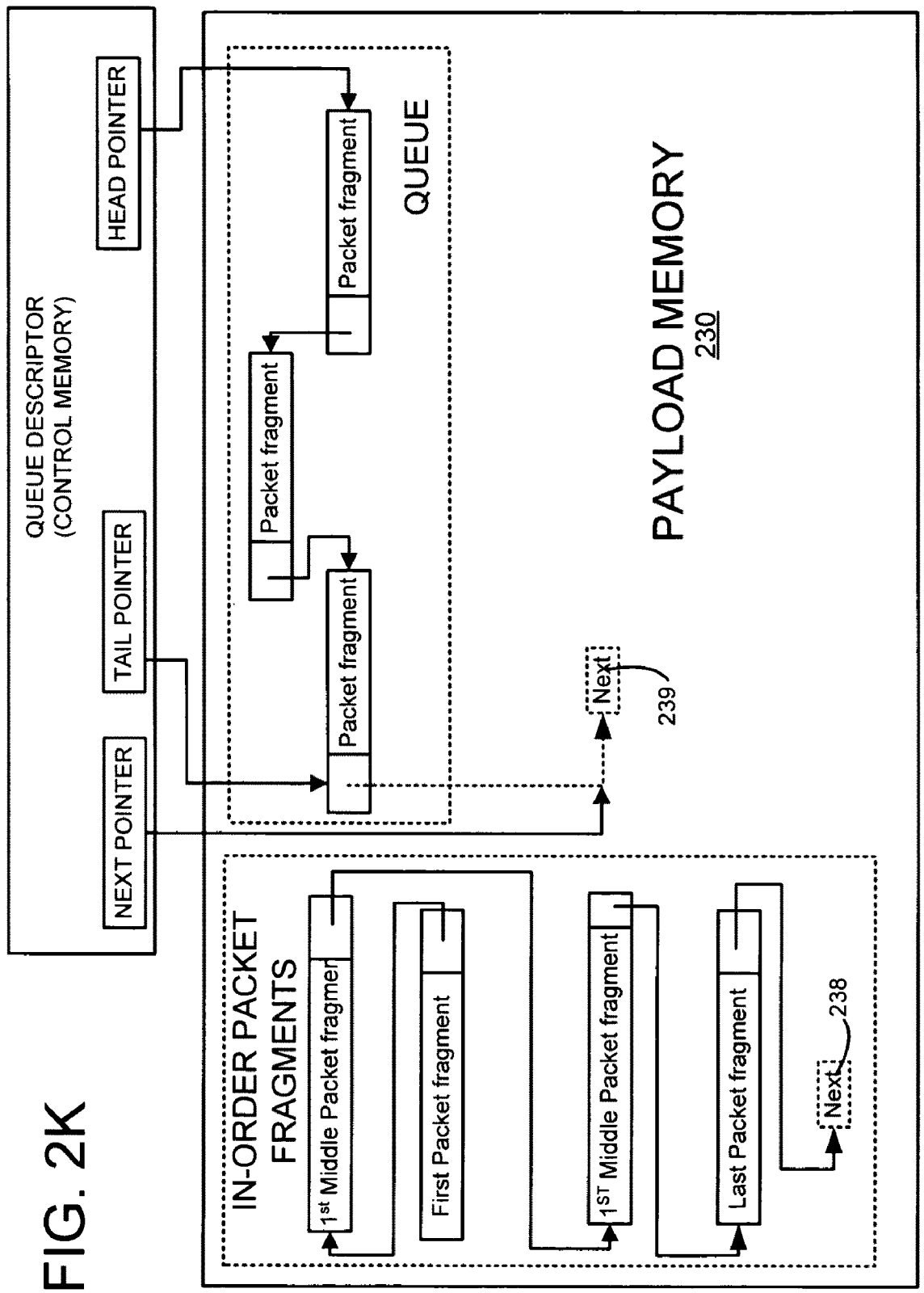

Creation of such linked lists (in the method of FIG. 2F) proceeds faster than stitching of individual fragments (in the method of FIG. 2B), because there are no "stitches" (i.e. pointer updates) that need to be made. In the example illustrated in FIG. 2I, on receipt of first fragment, it is simply placed in memory 230, and the next pointer of this first fragment is unused (although pointing to a valid address in memory 230). Thereafter, when the first middle fragment is received, then it is simply written to the address identified by the next pointer of the first fragment (as shown in FIG. 2J). Moreover, during this same write instruction, the next pointer of the first middle fragment is also updated, to point to the second middle fragment (as shown in FIG. 2K). The result of writing in act 225F in the method of FIG. 2F is illustrated in the example of FIG. 2K. Next, in response to the link instruction issued in act 218F, the traffic manager 220 performs act 227F to link the stitched packet fragments to their respective queue.

After linking in the method of FIG. 2F, the resulting structure (FIG. 2L) is similar to the corresponding structure shown in FIG. 2E except for the following difference: the next pointer in FIG. 2E is set to null whereas the next pointer in FIG. 2L may be used for another packet fragment (as and when it arrives). Note that at this stage, since the queue has a new next pointer 238 (FIGS. 2J-2L) which is same as the next pointer of the last fragment, an old next pointer 239 of the queue prior to linking is released (to a pointer pool 225 for use in future). Regardless of which method is performed, eventually, after the fragments are in order and have been enqueued, the fragments are scheduled for transfer on output bus 219, based on the priority of the queue in which they are linked, as illustrated by act 228B.

Figure 3A:
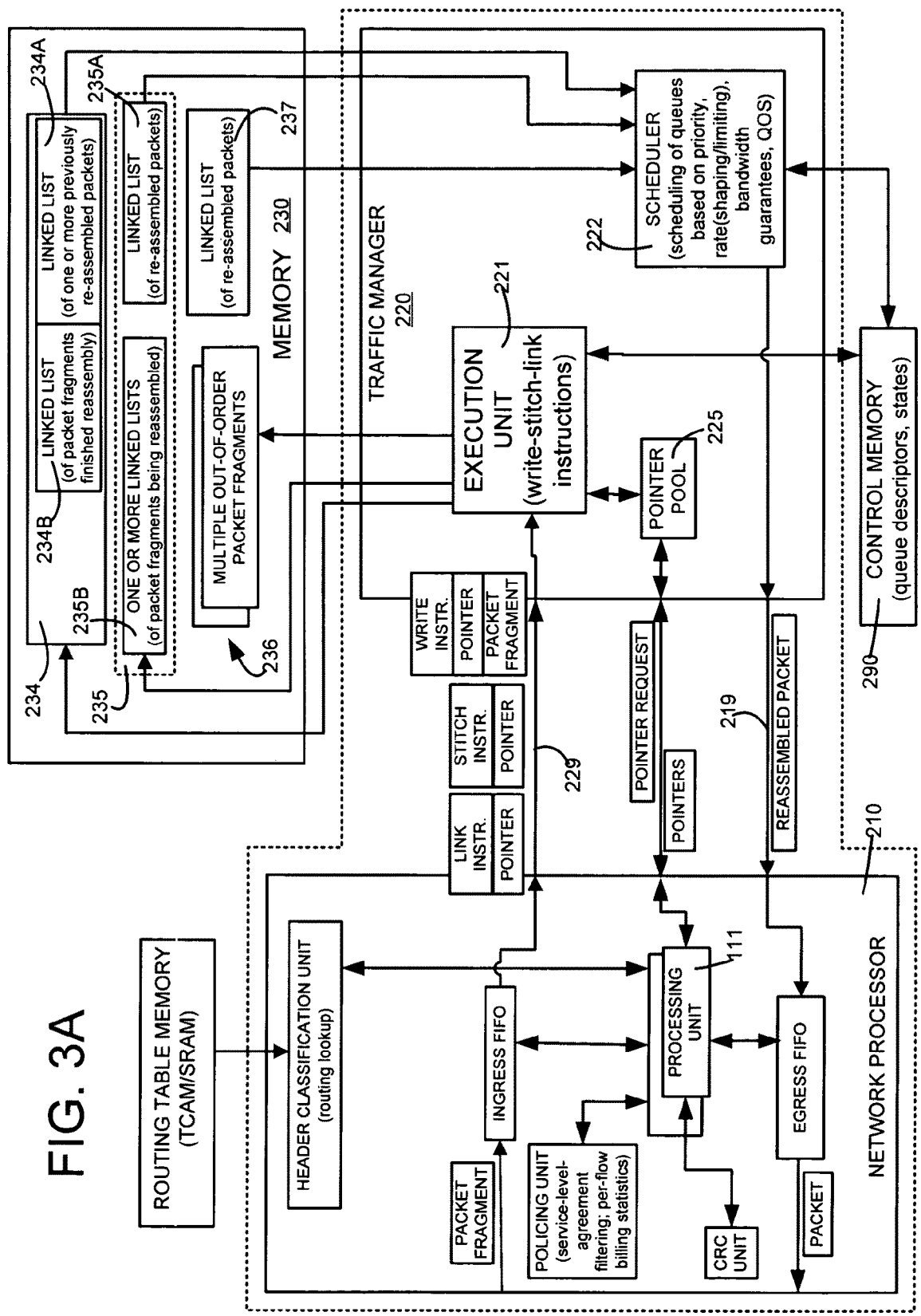
FIG. 3A illustrates, in an intermediate-level block diagram, a network processor coupled to a programmable traffic manager in some embodiments of the invention.

FIG. 3A illustrates, in memory 230, queues of the type described above in the form of linked lists. Specifically, one queue 234 is shown as having been just expanded from only one linked list 234A by addition of another linked list 234B. Linked list 234A may contain one or more previously reassembled packets, whereas linked list 234B is formed of packet fragments that are enqueued after being set up in the predetermined order. Another queue 235 is shown in the process of being expanded from linked list 235A that contains one or more previously reassembled packets. Packet fragments 235B of a single packet are in the process of being rearranged into the predetermined order of the single packet. Finally, a third queue in memory 230 includes only one linked list 237 of previously reassembled packets. Additional packet fragments 238 that are insufficient to form the complete packet are simply stored in memory 230 until all packet fragments are received.

Memory 230 in FIG. 3A provides a conceptual illustration of the queues, and in several implementations the packet data (also called Existing Packet Data) is held in memory 230 in the form of fixed length "cells." For example, such cells may be 128 bytes long. In such implementations, each packet fragment is stored in one or more cells, depending on the length of the fragment. When multiple cells are used to hold the data of a fragment, these multiple cells are linked to one another, e.g. by a next pointer of an earlier cell containing an address of the beginning of the next cell. In such a case, each fragment forms a singly linked list, and for this reason, fragments 235B are labeled in FIG. 3A as being one or more linked lists. Note that a list may contain only one cell, e.g. if fragment's data is less than the cell size.

In some embodiments, execution unit 221 (FIG. 3A) includes the above-described decode logic that decodes the instruction received on bus 229. Moreover, processing unit 111 in network processor 210, by virtue of being programmable, also includes a decode logic. However, the decode logic of network processor 210's processing unit 111 differs from the decode logic in traffic manager 220's execution unit 221, due to the difference in instruction sets supported by the two decode logics.

Also note that network processor 210 may include any number of processing units 111, depending on the embodiment. As shown in FIG. 3A, network processor 210 also includes a number of additional hardware circuits, such as a CRC unit (not labeled) that is used to compute the checksum for the packet being transmitted from the egress FIFO. Network processor 210 also includes a policing unit that implements, for example, service level agreements (SLA) filtering, and per-flow billing statistics. Network processor 210 also includes a header classification unit that is coupled to a routing table memory (implemented in a content-accessible-memory (such as TCAM) or a static random access memory (SRAM)), and this unit performs routing lookup on the incoming packet fragments in the ingress FIFO. The processing units 111 of this implementation are coupled to the just-described hardware circuits. A control memory 290 (FIG. 3A) may be used in some implementations to hold descriptors of queues and states, in which case memory 290 is coupled to traffic manager 220 (e.g. to each of execution unit 221 and scheduler 222).

In several embodiments, traffic manager 220 also includes a pointer pool 225 (FIG. 3A) that is coupled to each of processing unit 111 and execution unit 221. Pointer pool 225 is responsive to requests to supply or release pointers, which requests may originate from either or both of execution unit 221 and processing unit 111. Pointer pool 225 supplies a pair of pointers in response to each pointer request, although in other embodiments only one pointer may be supplied (thereby requiring two requests if a pair of pointers are needed). Each of processing unit 111 and execution unit 221 use the pair of pointers to store a first fragment and a last fragment in a list of fragments that when reassembled will form a packet. Note that in such embodiments, network processor 210 instructs traffic manager 220 to write packet fragments at certain specified address locations in memory 230 only for the first and last fragments (because only the first and last pointers are available to the network processor). Therefore, for storing one or more middle fragments, traffic manager 220 directly requests pointers from pointer pool 225.

Note that any number of pointers may be requested by traffic manager 220 and/or network processor 210, depending on their individual needs at any given time. For example, network processor 210 requests zero pointers for use with a stitch instruction when two adjacent fragments to be stitched are already in payload memory. Alternatively, network processor 210 requests one pointer for use with a write instruction when one adjacent fragment is already in memory and a current fragment is about to be written. When issuing the write instruction, if no adjacent fragment is in memory then the network processor requests two pointers from the pointer pool. Finally, the network processor may request three pointers if the fragment is the last fragment (one pointer is used as the HEAD pointer, another is used as the TAIL pointer, and the last is used as the NEXT pointer (as noted above the traffic manager 220 obtains additional pointers from the pointer pool 225 for any middle fragments).

Figure 3B:
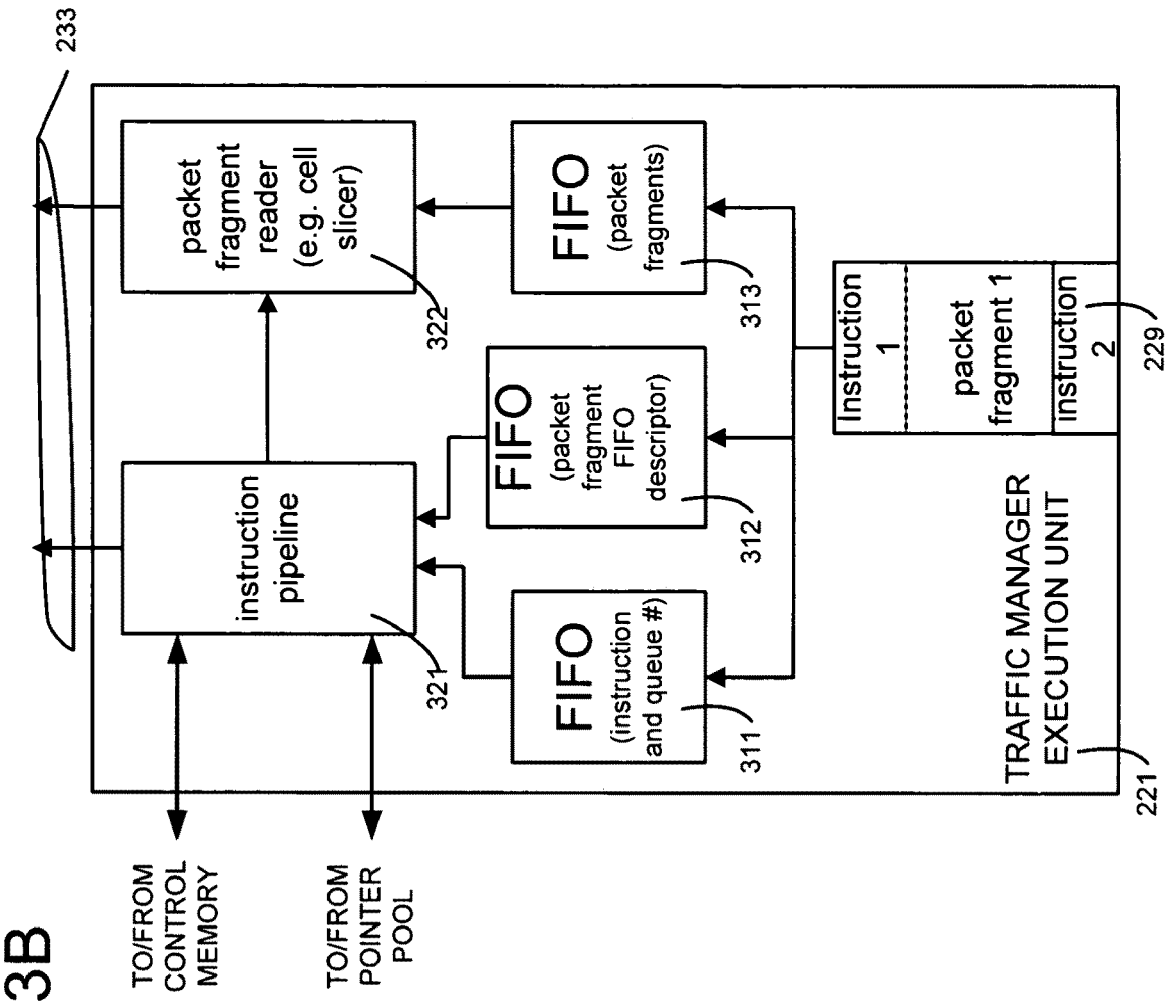
FIG. 3B illustrates, in a lower-level block diagram, several hardware blocks of logic and memory that are used to implement the execution unit of FIG. 3A in some embodiments.
Figure 3C:
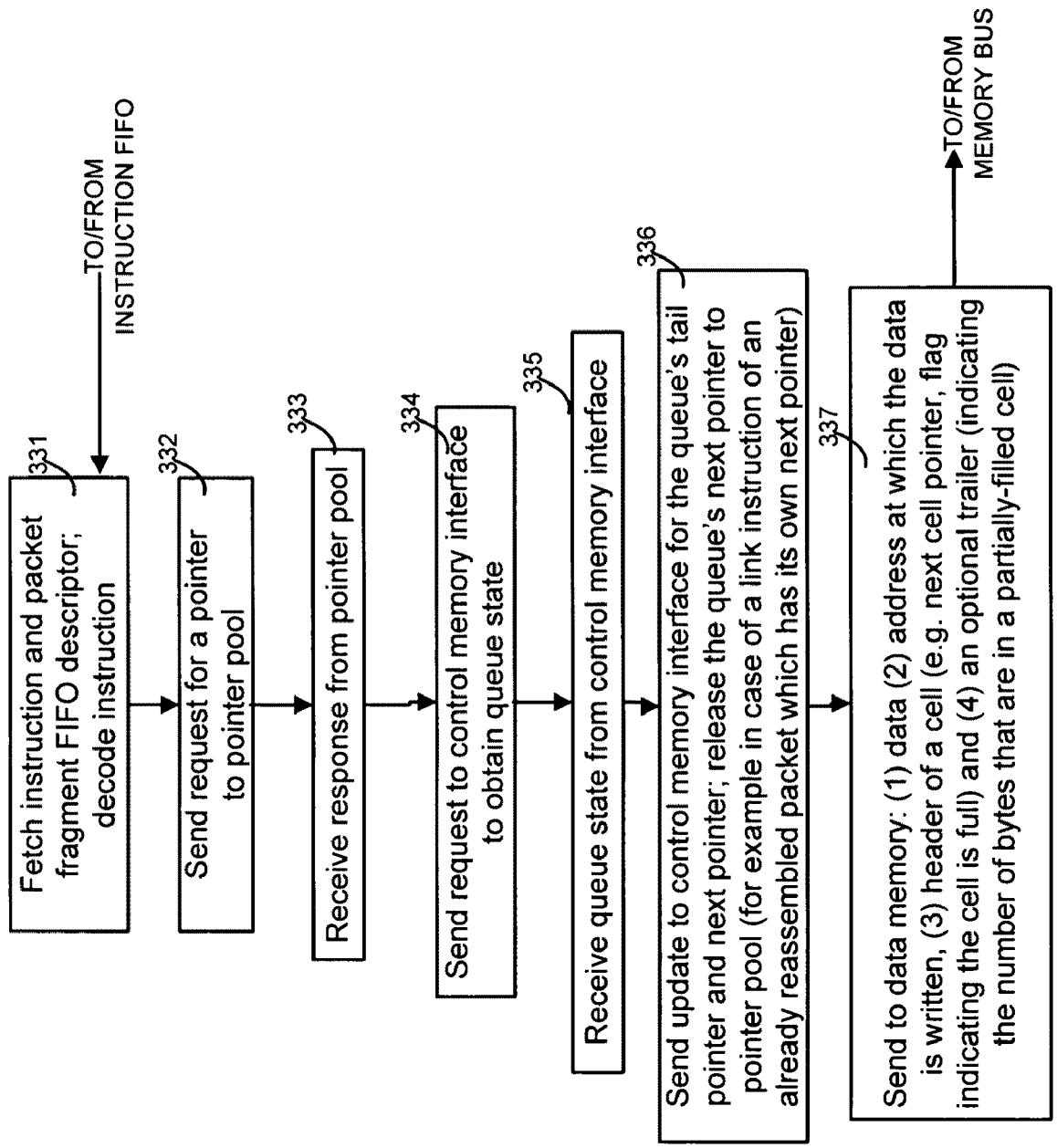
FIG. 3C illustrates, in a flow chart, acts performed in the execution pipeline of FIG. 3B in accordance with the invention.

Execution unit 221 of traffic manager 220 can be implemented in any manner well known in the art in view of this disclosure. In some embodiments, execution unit 221 is implemented as a pipeline 321 (FIG. 3B). The pipeline 321 has a number of stages 331-337 (FIG. 3C). Execution unit 221 also includes a first-in-first-out FIFO memories 311 and 312 that are both coupled to pipeline 321 (to first stage 331 therein). FIFO memory 311 holds instructions, whereas FIFO memory 312 holds the identities of queues that are to eventually hold the packet fragments. The packet fragments are held in another FIFO memory 313. All FIFOs 311, 312 and 313 are coupled to input bus 229 (which has been described above).

Pipeline 321 includes a first stage 331 that fetches an instruction from FIFO 311 and a descriptor of a packet fragment in FIFO 313. Next, a second stage 332 decodes the fetched instruction and if necessary (depending on the instruction and the data) sends a pointer request to the pointer pool. The number of pointers requested (by the traffic manager wherein the request is generated by stage 332) depend on whether the cell is first, middle, or last, and also on the instruction to be executed. Note that no pointer is requested when doing the stitching and linking.

Stage 333 receives the response from the pointer pool (if there are no pointers available then the data may be dropped). Next, stage 334 sends a request to the control memory interface, to obtain the state of the queue (including the head, tail and next pointers of the queue). Stage 335 receives a response from the control memory interface. Stage 336 sends a pointer update to the control memory interface (e.g. to update the tail pointer and the next pointer of the elongated queue). Depending on the situation, stage 336 may release one or more pointers to the pointer pool, e.g. the next pointer of the queue received by stage 336 may be released if the next pointer of the queue has been updated by stage 336 to be identical to the next pointer of the packet fragment that is being added to the queue.

Stage 337 sends data from the pipeline's earlier stages and also from FIFO 313 which holds a packet fragment to the data memory. Specifically, the data sent by stage 337 from the pipeline includes an address at which data is to be written (i.e. the data from FIFO 313), the header of a cell (e.g. the cell's next pointer, and a flag indicating whether or not all bytes in the cell contain valid data), and a trailer for the cell which is optionally present only for partially-filled cells (indicating the length within the cell which contains valid data). In some embodiments, packet fragment reader 322 reads each packet fragment from FIFO 313 and slices it up into a number of cells. The cells of each packet fragment are kept together in a linked list in memory 230 (on being transferred thereto).

Note that memory bus 233 is coupled to last stage 337 of pipeline 321. Note also that in addition to payload memory 230, traffic manager 220 is coupled to another memory (called control memory) that holds a descriptor for each queue, and the queue descriptor contains, for example, a head pointer and a tail pointer which respectively identify the beginning and the ending of the queue, statistics, and scheduling parameters (used by the scheduler 222).

Figure 3D:
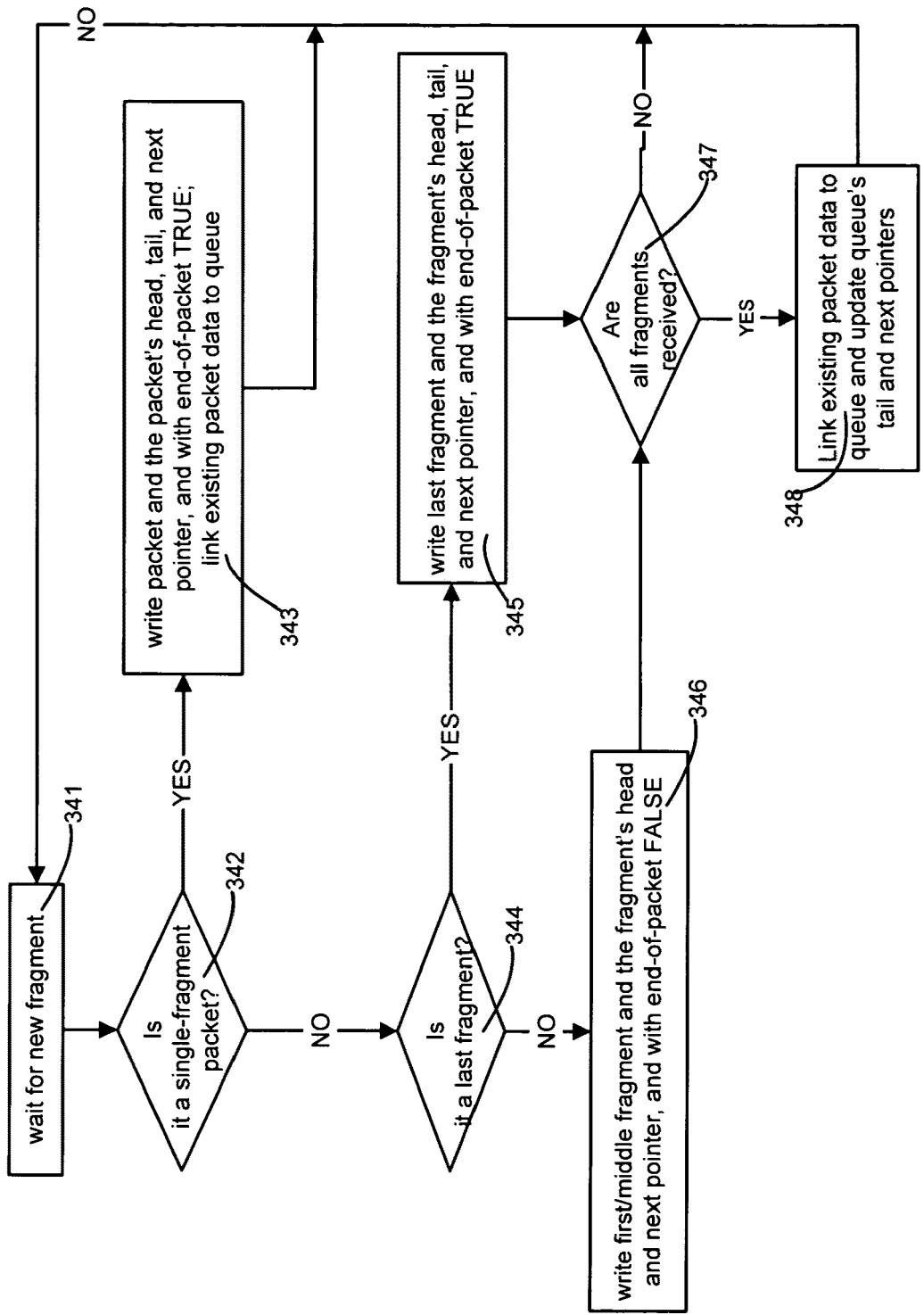
FIGS. 3D-3H illustrate, in flow charts, acts performed by a network processor in certain embodiments of the invention, to use a traffic manager that is programmable in accordance with the invention.
Figure 3E:
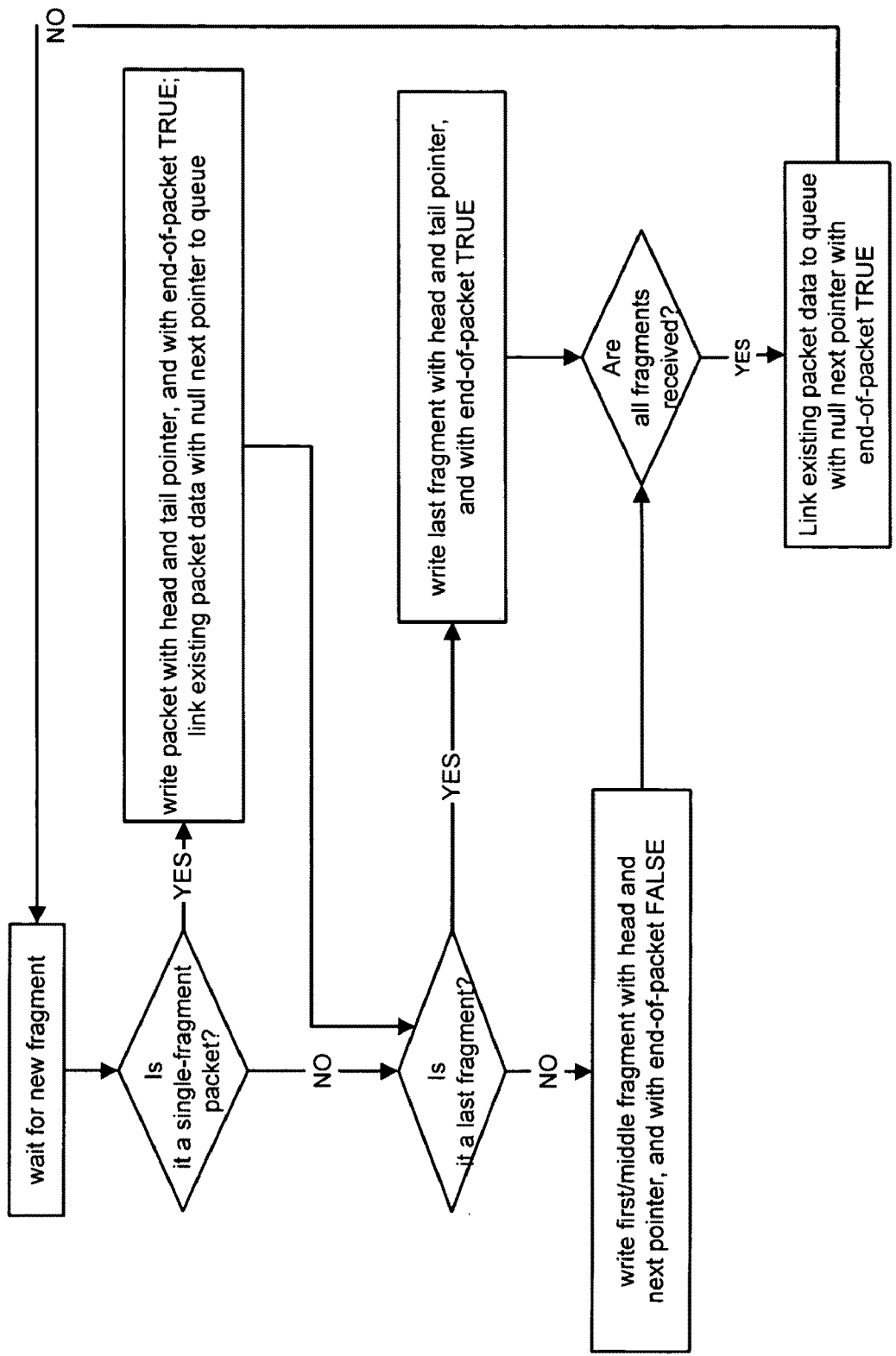
Figure 3F:
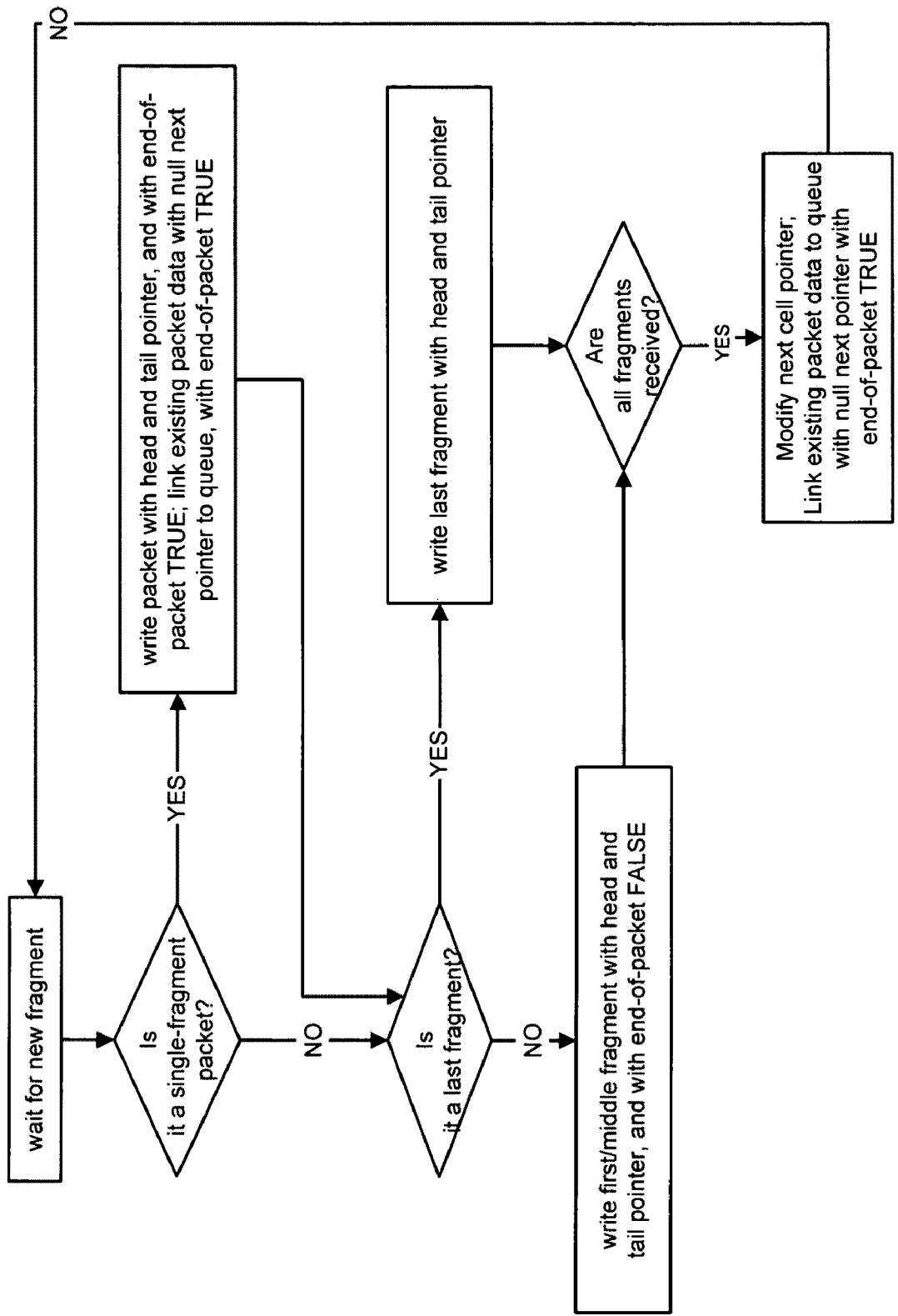
Figure 3G:
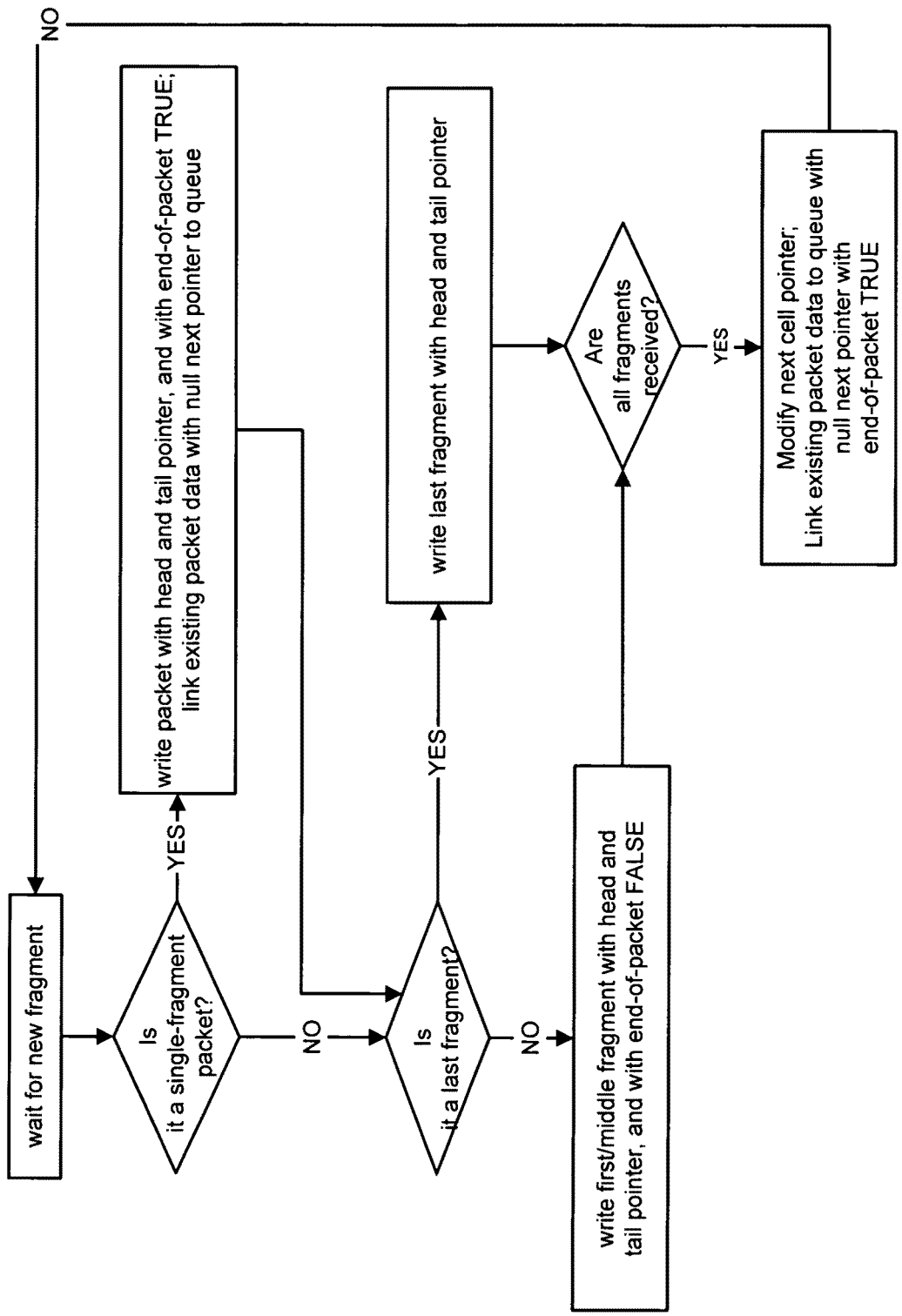
Figure 3H:
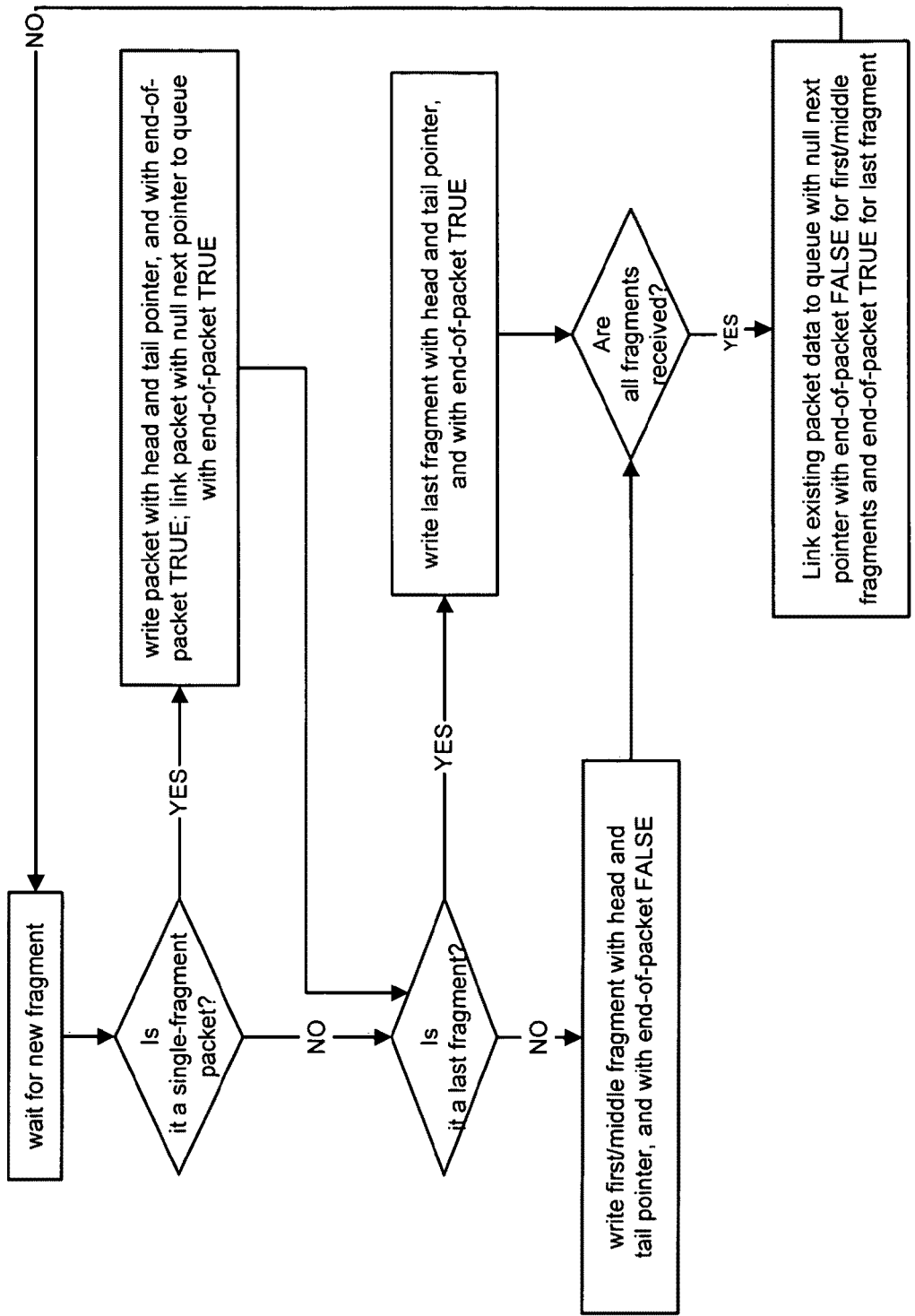

In some embodiments, a reassembly scheme illustrated in FIG. 3D is used by a network processor to instruct a traffic manager as follows. Specifically, in act 341, the network processor waits for a new fragment. When the fragment is received, the network processor checks (in act 342) whether or not the fragment contains the whole packet (i.e. a single-fragment packet), and if so then goes to act 343. In act 343, the network processor instructs the traffic manager as follows: write packet with head, tail and next pointer, with end-of-packet flag TRUE, and link the packet to the queue. Scheduler 222 uses the end-of-packet flag to know when transmission of a current packet is finished (because there are many queues but only one bus 219, one packet at a time is scheduled for transmission, and scheduler starts transmission of next packet e.g. from another queue on completion of transmission of the current packet).

In act 342, if the fragment that was received is not an entire packet, then the network processor goes to act 344 to check if the fragment is the last in the packet. If so, the network processor goes to act 345. In act 345, the network processor instructs the traffic manager as follows: write the last fragment with head, tail and next pointer, and with end-of-packet flag TRUE. Note that in this act, the network processor does not (yet) link the packet to the queue. Instead, the network processor checks in act 347 whether all fragments are received and if not, returns to act 341 to wait for another fragment. If all fragments were received, then the network processor goes to act 348 to link the packet to the queue, and thereafter returns to act 341.

In act 344, if the fragment was not the last fragment, then the network processor goes to act 346. In act 346, the network processor instructs the traffic manager as follows: write the first/middle fragment at an address identified by a head pointer and update the next pointer, and set end-of-packet flag FALSE. Note that in each of acts 343, 345 and 345, the network processor obtains 0, 1, 2 or 3 pointers from the pointer pool as described elsewhere herein.

The acts illustrated in FIG. 3D are summarized below in a table, as the first reassembly scheme. Moreover, the acts illustrated in FIGS. 3E-3H are similar to the corresponding acts illustrated in FIG. 3D, and they illustrate the four reassembly schemes that are also summarized below in the table.

On ingress of a packet fragment, a processing unit 111 in network processor 210 prepends a queuing instruction in front of each packet fragment sent to traffic manager 220. The queuing instructions are created by microcode and transferred to the traffic manager 220 by execution of a transfer instruction "Transfer Immediate Header" in one specific implementation of network processor 210. In this particular implementation, each such transfer instruction writes to the input bus 229 of the traffic manager 6 bytes of the queuing instruction. The queuing instruction can be up to 24 bytes long in one particular implementation. Not all 24 bytes of the queuing instruction need to be transferred. For instance, if a specific queuing instruction is only 10 bytes long, only two transfer instructions are needed to transfer the queuing instruction.

There are at least three types of queuing instructions in a queuing instruction set of some embodiments. One type of queuing instruction (also called "write" instruction) stores new data to payload memory but does not link the newly-stored data to a queue. Another type of queuing instruction (also called "link" instruction) does not store any new data into payload memory but simply links data that's previously been stored in the payload memory to a queue. Yet another type of queuing instruction (also called "stitch" instruction) modifies the next pointer (and status in some embodiments) of a single cell in payload memory.

Examples of six queuing instructions that are included in a queuing instruction set in some embodiments of the invention are as follows. One particular implementation includes additional instructions which are unrelated to reassembly, and hence they are not described below.

| Opcode | Queuing Instruction | Type of Instruction |
|---|---|---|
| 4'd6 | Link Existing Packet Data to queue | Link |
| 4'd7 | Link Existing Packet Data with Null Next Pointer to queue | Link |
| 4'd8 | Write Data with Head and Next Pointer | Write |
| 4'd9 | Write Data with Head and Tail Pointers | Write |
| 4'd10 | Write Data with Head, Tail and Next Pointers | Write |
| 4'd12 | Modify Next Cell Pointer | Stitch |

The term "Existing Packet Data" in the above table refers to the data of one or more fragments of a packet on which a Write instruction has been already performed and therefore refers to data already located in memory (also called "payload" memory) 230.

The above-listed six queuing instructions are used in various reassembly schemes, depending on the embodiment. In one embodiment, all of the six queuing instructions are supported in the queuing instruction set, and five examples reassembly schemes that are supported in this embodiment are described above in the table.

Note that in the following table, "EOP" denotes a flag indicating the end of packet. Note that the first two reassembly schemes are similar to one another and also similar to the scheme illustrated in FIG. 2F (described above). A primary difference between these two reassembly schemes is that the second reassembly scheme maintains each queue's next pointer as "null" and therefore uses one less pointer per queue than the first reassembly scheme. Similarly, the third and fourth reassembly schemes in the following table are similar to one another and also similar to the scheme illustrated in FIG. 2B (described above). The third and fourth schemes have a difference from one another which is same as the just-described difference for the first and second schemes. Finally, the very last reassembly scheme in the following table does not use a stitch instruction at all. Instead, in this fifth reassembly scheme, after all fragments of a packet have been received, each fragment is individually linked to the queue in the predetermined order. For this reason, there is no stitching (explicit or on-the-fly) in this fifth reassembly scheme.

The following table describes five reassembly schemes which are illustrated in FIGS. 3D-3H. In the following table, the instruction Link Existing Packet Data with Null Next Pointer to queue can link fragments or packets and the type of data is identified as follows: EOP=0 means a fragment is linked (because end-of-packet is FALSE), EOP=1 means a packet is linked (because end-of-packet is TRUE).

| Reassembly Schemes | Queuing instruction for First/middle Fragments | Queuing instruction for Last Fragment | Queuing instruction after all fragments have arrived | Queuing instruction for Single-fragment Packet | Comments |
|---|---|---|---|---|---|
| ON-THE-FLY STITCHING Assemble fragments (arriving out-of-order) in payload memory as they arrive, then link to queue (See FIG. 3D) | Write Data with Head and Next Pointers with EOP = 0 (see act 346) | Write Data with Head, Tail and Next Pointers with EOP = 1 (see act 345) | Link Existing Packet Data to queue (see act 348) | use Write Data with Head, Tail and Next Pointers with EOP = 1 and Link Existing Packet Data to queue (see act 343) | Number of writes equal to number of cells plus one. Queue's next pointer is valid Avoids fetching pointer when a reassembled packet is received |
| ON-THE-FLY STITCHING Assemble fragments (arriving out-of-order) in payload memory as they arrive, then link to queue (See FIG. 3E) | Write Data with Head and Next Pointers with EOP = 0 | Write Data with Head and Tail Pointers with EOP = 1 | Link Existing Packet Data with Null Next Pointer to queue with EOP = 1 | Write Data with Head and Tail Pointers with EOP = 1, Link Existing Packet Data with Null Next Pointer to queue with EOP = 1 | Number of writes equal to number of cells plus one. Queue's next pointer is null Uses one less pointer per queue than the above scheme |
| EXPLICIT STITCHING Write fragments into payload memory, link them by modifying next cell pointers, then link assembled packet data to queue (See FIG. 3F) | Write Data with Head and Tail Pointers with EOP = 0 | Write Data with Head and Tail Pointer with EOP = 0; | Modify Next Cell Pointer, Link Existing Packet Data with Null Next Pointer to queue with EOP = 1; | use Write Data with Head and Tail Pointers with EOP = 1 and Link Existing Packet Data with Null Next Pointer to queue with EOP = 1 | Does not require fragments to arrive in order. Number of writes equal to number of cells plus number of fragments Queue's next pointer is null Uses one less pointer per queue than following scheme |
| EXPLICIT STITCHING Write fragments into payload memory, link them by modifying next cell pointers, then link assembled packet data to queue (See FIG. 3G) | Write Data with Head and Tail Pointers with EOP = 0 | Write Data with Head, Tail, and Next Pointers with EOP = 1 | Modify Next Cell Pointer, Link Existing Packet Data to queue | use Write Data with Head, Tail and Next Pointers with EOP = 1 and Link Existing Packet Data to queue | Does not require fragments to arrive in order. Number of writes equal to number of cells plus number of fragments Queue's next pointer is valid Avoids fetching pointer when a reassembled packet is received |
| LINK EACH FRAGMENT INDIVIDUALLY TO QUEUE (NO STITCHING) Write fragments into payload memory, then link them to queue one by one (See FIG. 3H) | Write Data with Head and Tail Pointers with EOP= 0 | Write Data with Head and Tail Pointers with EOP = 1 | Link Existing Packet Data with Null Next Pointer to queue with EOP = 0 for first/middle fragments, with EOP = 1 for last fragment | Write Data with Head and Tail Pointers with EOP = 1, Link Existing Packet Data with Null Next Pointer to queue with EOP = 1 | Does not require fragments to arrive in order. Number of writes equal to number of cells plus number of fragments |

In some implementations, there are restrictions on which queuing instructions can be applied to the same queue. The following table shows the allowed set of queuing instructions that can be applied to the same queue. Each column in the table shows the set of instructions that can be applied to the queue (marked "Yes") and the set of instructions that can't be applied to the queue (marked "No") as a result of applying the allowed instructions.

| Queuing instruction | queue A | queue B |
|---|---|---|
| Link Existing Packet Data to queue (Link instruction) | Yes | No |
| Link Exisiting Packet Data with Null Next Pointer to queue (Link instruction) | No | Yes |
| Write Data with Head and Next Pointers (Write instruction) | Yes | Yes |
| Write Data with Head and Tail Pointers (Write instruction) | Yes | Yes |
| Write Data with Head, Tail, and Next Pointers (Write instruction) | Yes | Yes |
| Modify Next Cell Pointer (Stitch instruction) | Yes | Yes |

Figure 4A:
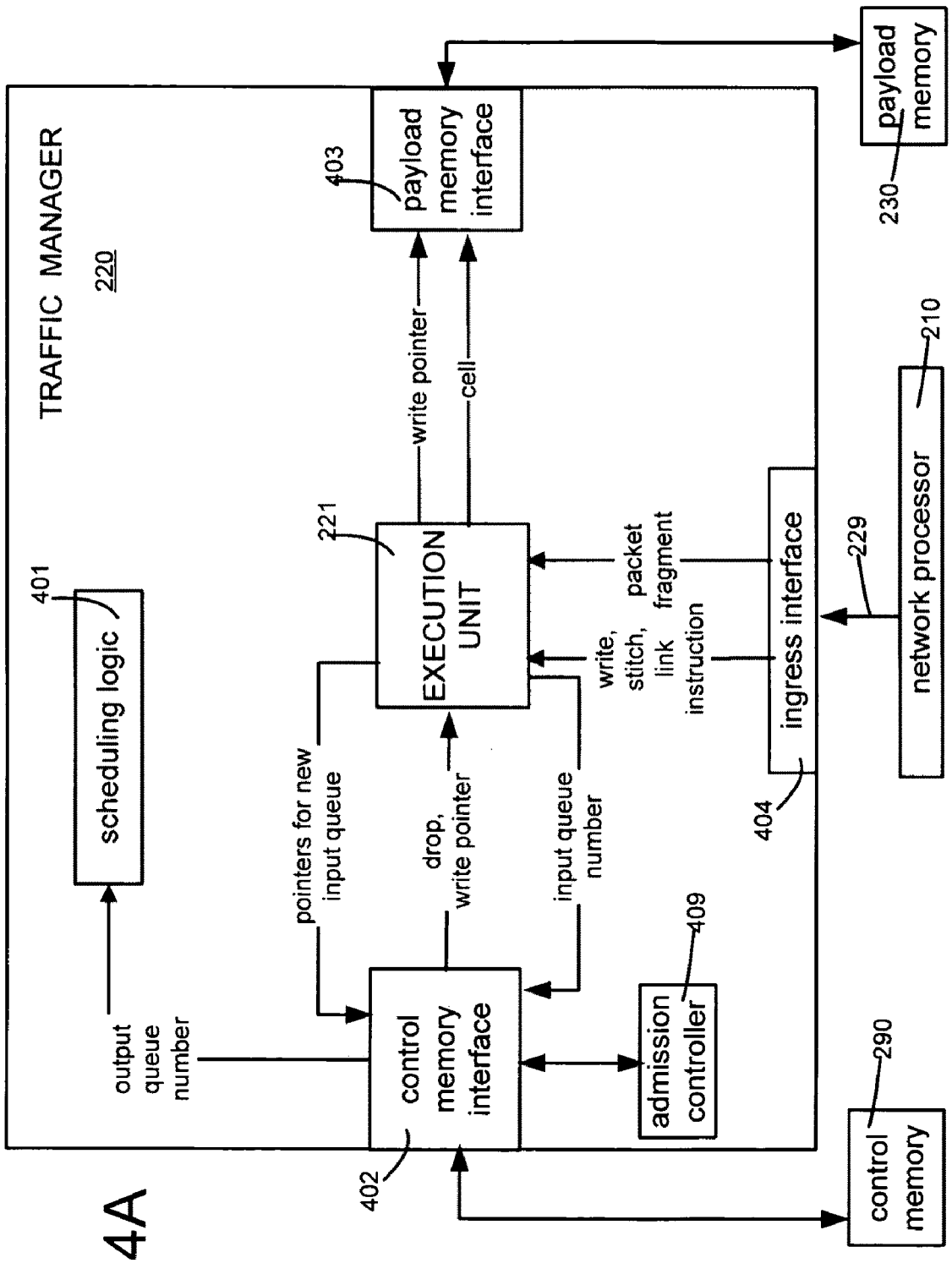
FIGS. 4A and 4B illustrate, in high-level block diagrams, use of various hardware circuits of an illustrative traffic manager implementation in accordance with the invention to implement an ingress procedure and an egress procedure respectively.
Figure 4B:
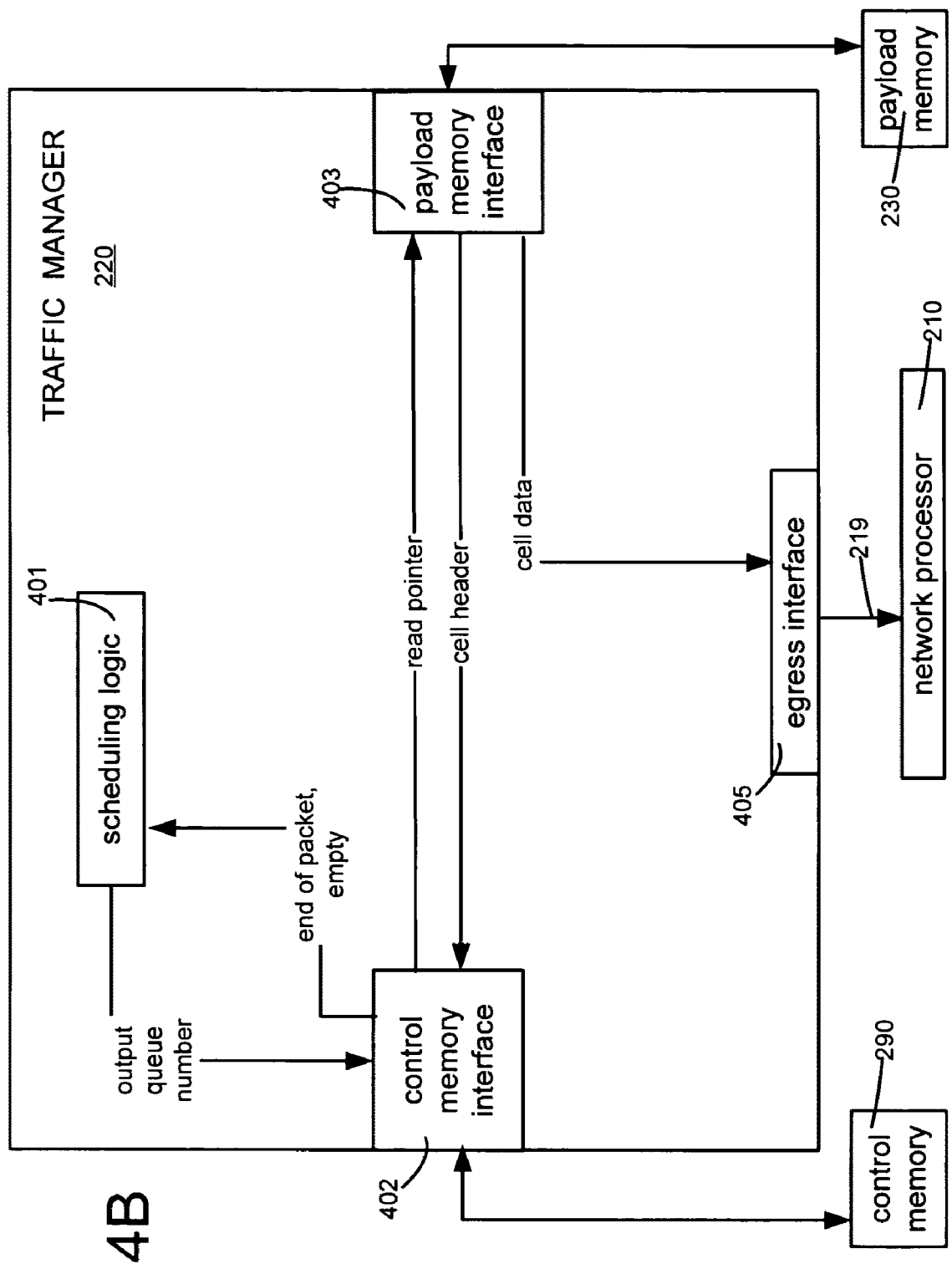

Note that FIGS. 2A and 3A illustrate the invention at a conceptual level, whereas one illustrative implementation is shown in FIGS. 4A and 4B as discussed next. Specifically, instead of scheduler 222 (FIGS. 2A and 3A) being coupled to memory 230 and being in the data path of supplying reassembled packets to output bus 219, in the illustrative implementation of FIGS. 4A and 4B, a scheduling logic 401 is isolated from the output datapath. Note that the same traffic manager 220 is shown in both FIGS. 4A and 4B, and all the hardware blocks and the buses shown in these two figures are found in a single hardware circuit. Two FIGS. 4A and 4B are used merely for convenience in showing the individual blocks that are used in processing the incoming data and the outgoing data respectively.

Traffic manager 220 of FIGS. 4A and 4B also includes two interfaces to the two memories, namely an interface 402 to control memory 290, another interface 403 to payload memory 230. In addition, traffic manager 220 includes two additional interfaces, namely interface 404 to bus 229 in the incoming direction (called "ingress interface"; see FIG. 4A) and interface 405 to bus 229 in the outgoing direction (called "ingress interface"; see FIG. 4B).

The various hardware blocks in FIGS. 4A and 4B are now described briefly. The detailed implementation of such blocks is not a critical aspect of the invention, because such implementations differ, depending on the embodiment and the application. Referring to FIG. 4A, ingress interface 404 receives queuing commands and packets from the bus 229 and forwards them to execution unit 221. Referring to FIG. 4B, egress interface 405 receives cells from payload memory interface 403, assembles the data contained therein thereby to reassemble the packet, and transmits the reassembled packet on bus 219.

Referring to FIG. 4A, on ingress, execution unit 221 decodes queuing instructions, slices the packet fragment into cells, and asks the control memory interface 402 for state information on the queue to be used for storing input data (also called "input queue"), and admission control decision for each cell. If the cell is accepted by admission controller 409, then execution unit 221 sends one (or more) write-cell request(s) to payload memory interface 403. If the cell is rejected, execution unit 221 drops the cell. Finally, execution unit 221 sends the updated state information on the input queue to the control memory interface 402. Note that in the implementation illustrated in FIGS. 4A and 4B, execution unit 221 is not involved in the egress direction at all.

Referring to FIG. 4A, on ingress, payload memory interface 403 receives write-cell requests from execution unit 221, and writes each cell into payload memory 230 at the specific location identified by the write pointer which is also received with each write-cell request. Note that in one particular implementation, payload memory interface 403 segments each 128-byte cell into two 64-byte half-cells, and individually stores each half-cell in memory 230. Note that the pointer pool 225 (FIG. 2A) may be implemented in such a payload memory interface 403.

Referring to FIG. 4B, on egress, payload memory interface 403 receives a read pointer from the control memory interface 402, and reads the cell from payload memory 230. In the above-described particular implementation, payload memory interface 403 issues two half-cell read requests to the payload memory 230, and reconstructs the cell from the two half-cells, and sends the cells directly to egress interface 405. In addition, payload memory interface 403 returns the cell's next pointer to control memory interface 402.

Referring to FIG. 4A, on ingress, control memory interface 402 receives requests for state information about an input queue from execution unit 221, and retrieves the needed information from control memory 290, and asks admission controller 409 for drop/accept decision, and forwards the input queue's state information and admission control decision to execution unit 221. Control memory interface 402 also updates the input queue's state information in control memory 290 upon request by execution unit 221. Moreover, control memory interface 402 also informs the queue number for output to the scheduling logic 401.

Referring to FIG. 4B, on egress, control memory interface 402 receives the number of the queue scheduled for output (also called "output queue") from scheduling logic 401, retrieves the read pointer of the identified output queue, and sends it to payload memory interface 403. After receiving the cell's next pointer from payload memory interface 403, control memory interface 402 updates the output queue's state information in control memory 290.

Admission controller 290, on ingress, receives request from control memory interface 402 and makes admission control decision. Admission controller 290, on egress, updates the occupancy numbers as cells are transmitted (not shown in FIG. 4B). Moreover, scheduling logic 401, on ingress, receives the queue number of the output queue from control memory interface 402. On egress, scheduling logic 401 asks control memory interface 402 to retrieve the output queue's state information from control memory 290 and schedules the output queue for data transfer.

Finally, in the implementation illustrated in FIGS. 4A and 4B, payload memory 230 may be sufficiently large enough to store up to, for example, two million cells with each cell being 128 bytes long. Furthermore, control memory 290 may be sufficiently large to store state information on, for example, 128,000 queues.

In some embodiments, payload memory 230 is divided into two sections (not shown); a first section contains free pointer cells and second section contains actual packet fragment data. Such a payload memory 230 supports two payload memory data bus sizes, namely 64 bits and 72 bits. For both types it provides ECC protection for the payload memory cell's content. In such embodiments, the payload memory cell for 64 bits payload memory width contains 114 bytes of packet data. For 72 bits payload memory width it contains 128 bytes of packet fragment data. The free pointer cell for 64 bits payload memory width contains 40 free cell pointers and for 72 bits payload memory type width it also contains 40 free cell pointers.

On ingress, packets of many embodiments are segmented into fixed size cells. Each cell is 128 bytes, of which 8 bytes are overhead and 120 bytes are available for data. The cells are stored as linked lists in payload memory, with each cell containing a pointer to the next cell in the linked list. Each linked list corresponds to a queue, whose state information is stored in a data structure called Input Flow Descriptor (IFD). As noted elsewhere herein, such state information includes a next pointer indicating where the next cell arriving in this queue should be stored, and a tail pointer indicating the location of the most recent cell that contains the end of a packet.

In several embodiments, as each cell is queued, an entry inside control memory 290, in a database called the End of Packet Database (EOP DB) is updated to indicate if the cell contains the end of a packet. The database contains as many entries as the number of cell locations in payload memory. Each entry contains just 1 bit (1'b1 indicates end of packet, 1'b0 indicates does not contain end of packet). The entry to be updated is the entry whose address is the address of the current cell. When a queue is scheduled to be transmitted, the cell at the head of the linked list is transmitted. The location of the linked list head is stored in the queue's state information which is stored in another data structure called the Output Flow Descriptor (OFD). The read pointer in this state information is updated with each cell transmission. Typically, in case of unicast, there is only one OFD corresponding to each IFD. In case of multicast, there are multiple OFDs corresponding to a single IFD, each with its own read pointer. Hence, in multicast, each cell is read multiple times, but the cell is not copied multiple times.

To summarize, control memory interface 402 manages the data on connections which are set up by the user to specify the characteristics of each traffic flow. Moreover, payload memory interface 403 manages the cells or blocks where the packet fragment's data is stored in the payload memory 230. Finally, execution unit 221 decodes and executes the queuing instructions from the network processor 210. In the typical case, as packet fragments arrive, network processor 210 classifies the packet fragment and attaches a queue number and queuing instructions.

Execution unit 221 parses the queuing instructions and sends the queue number to be processed by the control memory interface 402. Control memory interface 402 uses this queue number for admission control. If the packet fragment fails admission control or is unable to be admitted for resource reasons, a message is sent to the execution unit 221 to drop the packet fragment. If the packet fragment is admitted, control memory interface 402 forwards the IFD's write pointer to the execution unit 221. Execution unit 221 then slices the packet into cells and forward the cells and the write pointers to the payload memory interface 403, one cell at a time. Execution unit 221 asks the control memory interface 402 to update the IFD pointers and EOP database. If not yet active in the traffic manager, the control memory interface 402 will activate the a single (unicast) or multiple (multicast) queue numbers. These queue numbers are then submitted to be inserted into the scheduling logic 401.

The egress process is initiated when the scheduling logic 401 selects an output queue number for the data to be transmitted. The control memory interface 402 responds with information the scheduling logic 401 requires to proceed to schedule the next flow. (EOP, empty). It also sends a pointer to the payload memory interface 403 with the location of the cell to be read. Upon reading the cell, the data portion is forwarded to the egress interface for processing by the network processor. A pointer to the next cell on this queue is sent to the flow control memory interface 402 so that the state of that queue can be updated.

For each of several queuing instructions of the type described above, its format, its parameters, its detailed functional and implementation description, an example of its usage, and its sample applications are described next. In the following tables, FEOP stands for "first cell end of packet" status. This flag indicates that the entire packet is contained in a single cell, and therefore the first cell marks an end of packet.

Note that in the following description, in case of a write instruction, the head, tail and next pointers that are mentioned refer to the respective pointers of a fragment whose data is being written. Similarly, in the case of a link instruction, the head, tail and next pointers that are mentioned refer to the respective pointers of a packet whose data is being linked except as follows. In case of the instruction Link Existing Data with Null Next Pointer to queue, the pointers that are mentioned refer to the respective pointers of either a packet or a fragment depending on the value of the EOP bit (end of packet). If the EOP bit is set to TRUE then the pointers are of a packet else the pointers are of a fragment. Note that kind of data (packet or fragment or cell) being pointed to will be apparent based on the context in which each specific pointer is mentioned.

Figure 5A:
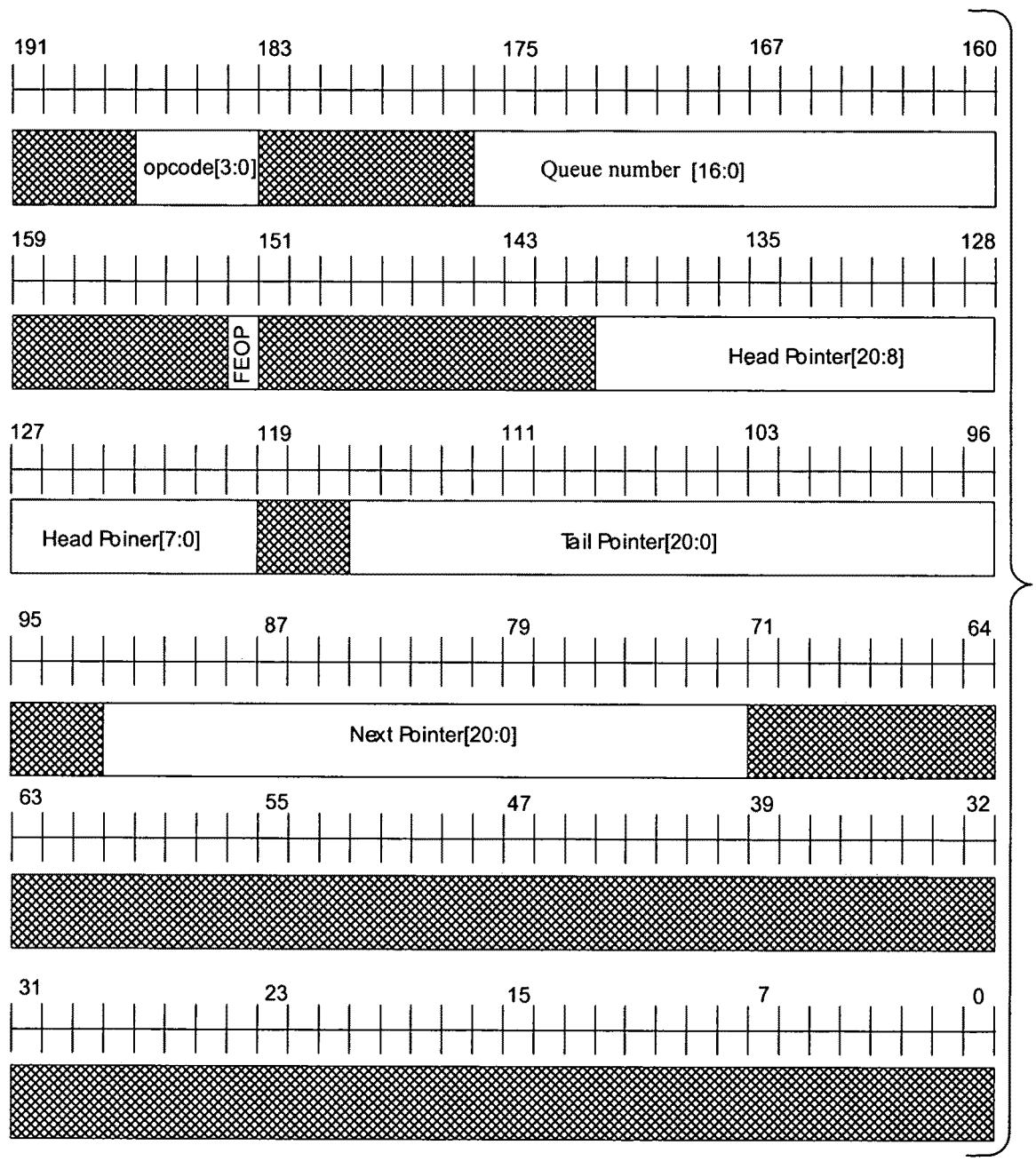
FIGS. 5A and 5B illustrate the format and exemplary use respectively of a link instruction in the just-described instruction set.

Queuing instruction "Link Existing Packet Data to queue" has the format illustrated in FIG. 5A, and it is issued with the following parameters.

| Parameter | Size (bits) | Meaning |
| --- | --- | --- |
| Opcode | 4 | The opcode for this queuing instruction is 4'b0110 |
| queue | 17 | input flow id |
| FEOP | 1 | If the first cell of the Existing Packet Data is a single cell, set this field to 1, otherwise set to 0. |
| Head Pointer | 21 | The location in payload memory of the first cell of the Existing Packet Data. |
| Tail Pointer | 21 | The location in payload memory of the last cell of the Existing Packet Data. |
| Next Pointer | 21 | The next pointer of the last cell of the Existing Packet Data. |

This queuing instruction is used to link the data of a single packet or multiple packets that's already resident in payload memory to a queue. The next pointer field of the cell referenced by queue's tail pointer will be overwritten with Head Pointer. The queue's write pointer will be released back to free pointer cache. The queue's new write pointer will be parameter Next Pointer. The queue's new tail pointer is the parameter Tail Pointer. EOP database will not be updated.

| Instruction | Location of first cell | Location of last cell | Next pointer of last cell | queue's new tail pointer | queue new write pointer |
| --- | --- | --- | --- | --- | --- |
| Link Existing Packet to queue | not applicable | not applicable | not applicable | Tail Pointer | Next Pointer |

Figure 5B:
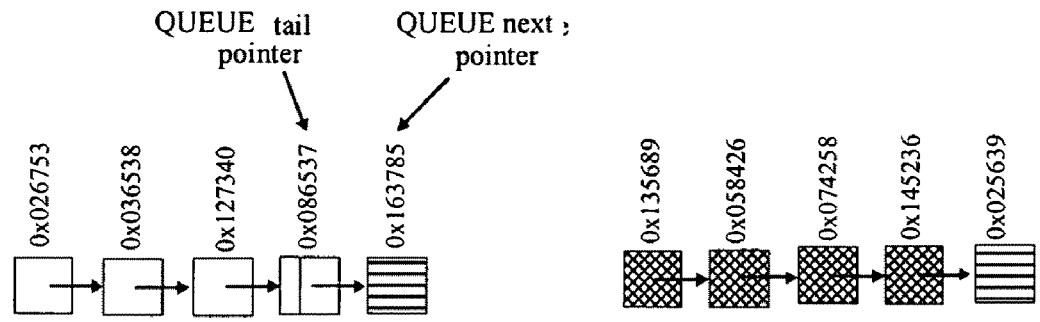
Figure 5B:
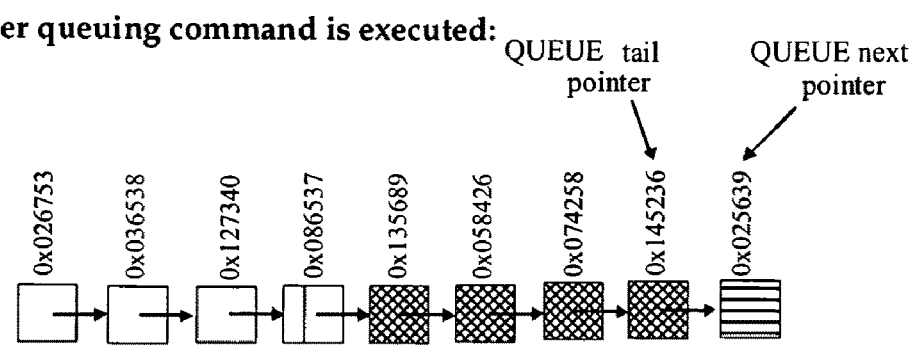

In this instruction, if the queue is not enabled, the existing packet data will not be linked to queue. An example of usage of this instruction is illustrated in FIG. 5B. This instruction can be used to link assembled packet data to a queue in the reassembly scheme where fragments are first reassembled in payload memory, then linked to queue. Such scheme is applicable to IP de-fragmentation.

Figure 6A:
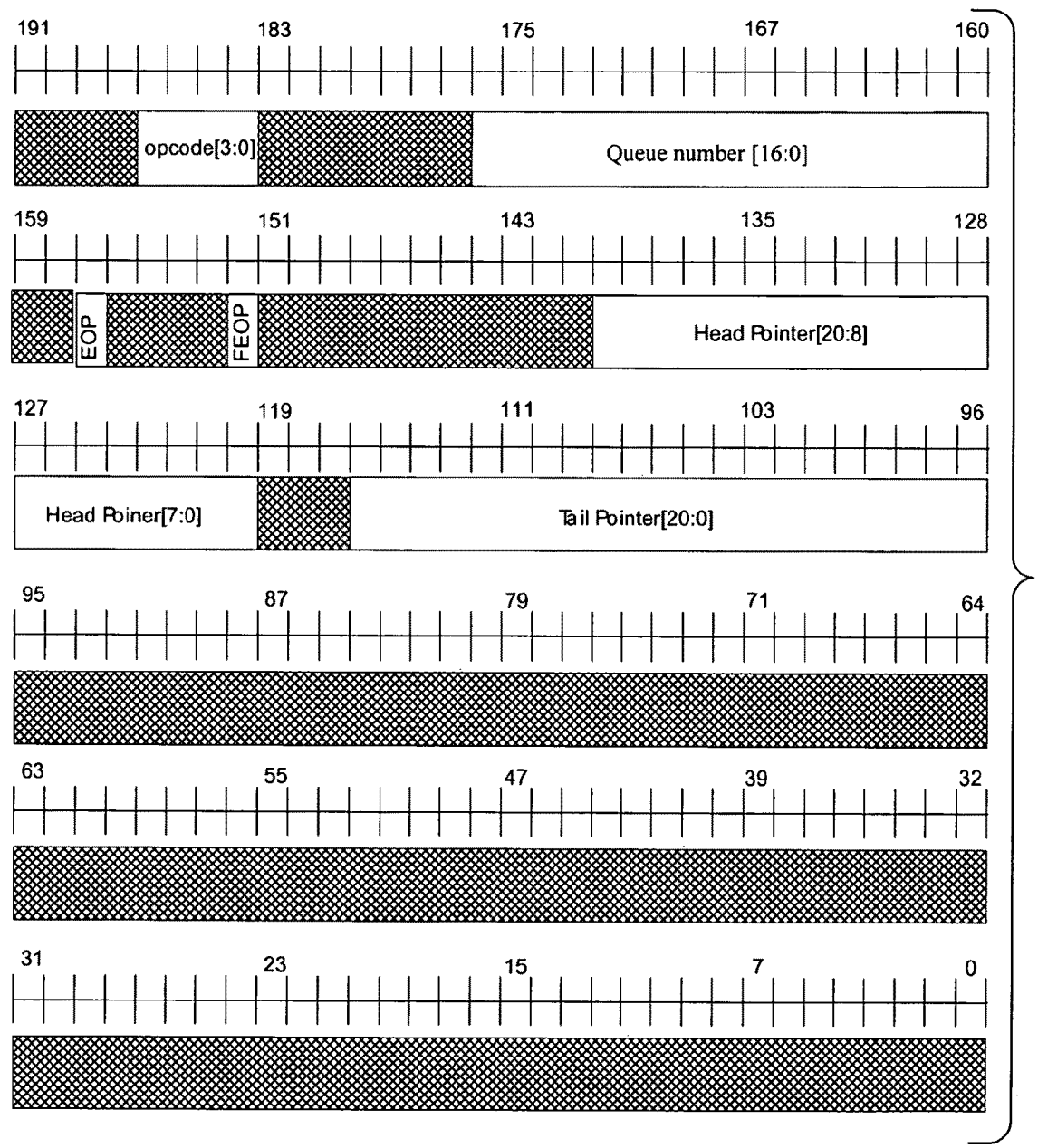
FIGS. 6A and 6B illustrate the format and exemplary use respectively of another link instruction in the just-described instruction set.

Specifically, in some implementations of the type described herein, a queuing instruction "Link Existing Packet Data with Null Next Pointer to queue" has the format illustrated in FIG. 6A, and it is issued with the following parameters.

| Parameter | Size (bits) | Meaning |
| --- | --- | --- |
| Opcode | 4 | The opcode for this queuing instruction is 4'b0111 |
| queue | 17 | input flow id |
| EOP Indication | 1 | 1'b0 = the last cell of the existing data does not contain end of packet<br>1'b1 = the last cell of the existing data contains the end of packet |
| FEOP | 1 | If the first cell of the Existing Packet Data is a single cell, set this field to 1, otherwise set to 0. |
| Head Pointer | 21 | The location in payload memory of the first cell of the Existing Packet Data. |
| Tail Pointer | 21 | The location in payload memory of the last cell of the Existing Packet Data. |

This queuing instruction is used to link data already resident in payload memory to a queue whose last cell's next pointer is null.

| Instruction | Location of first cell | Location of middle cells | Location of last cell | Next pointer of last cell | queue's new tail pointer | queue's new write pointer |
| --- | --- | --- | --- | --- | --- | --- |
| Link Existing Data with Null Next Pointer to queue | not applicable | not applicable | not applicable | not applicable | If EOP = 0, unchanged. If EOP = 1, Tail Pointer. | Tail Pointer |

Figure 6B:
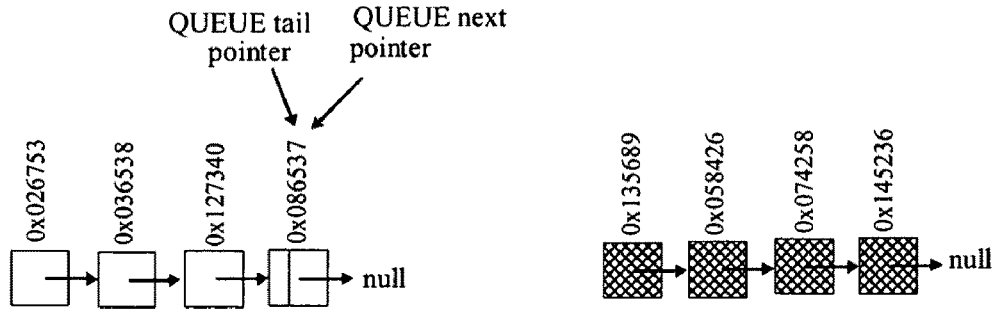
Figure 6B:
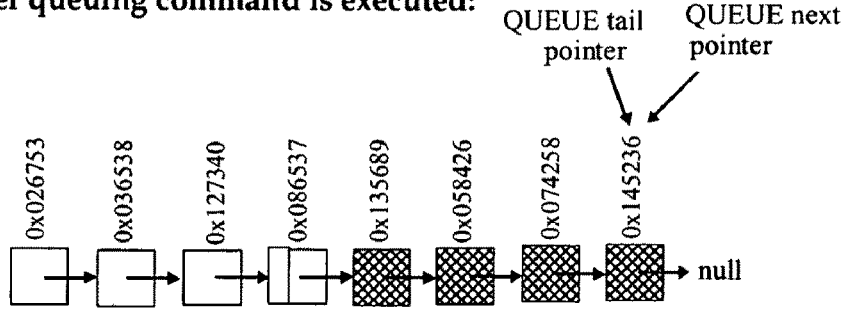

If queue is not enabled, the existing data will not be linked to queue. An example of usage of this instruction is illustrated in FIG. 6B. This instruction can be used to link fragments to queue in the reassembly scheme where fragments are first written into payload memory, then linked to queue one by one.

Figure 7A:
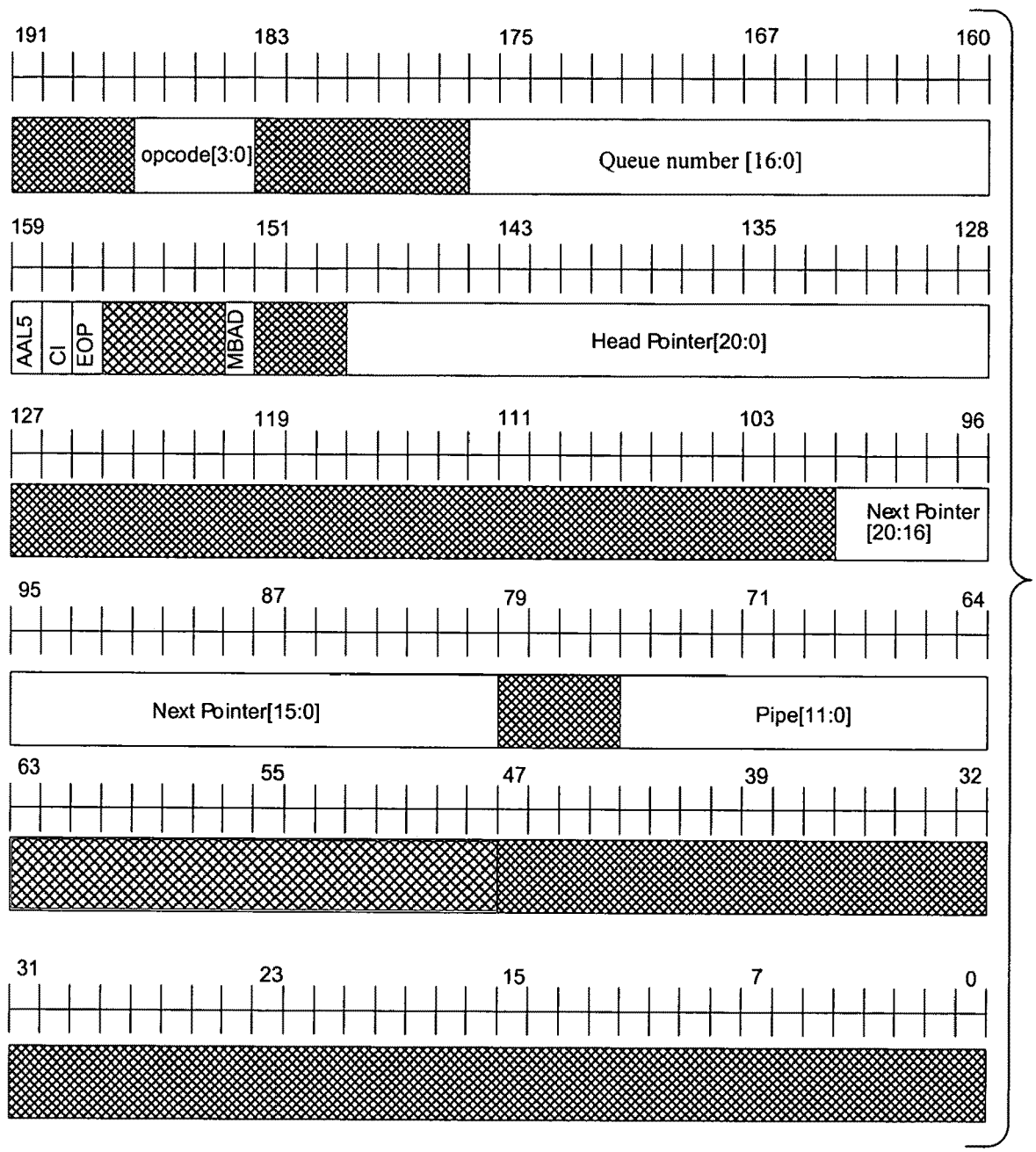
FIGS. 7A and 7B illustrate the format and exemplary use respectively of a write instruction in the just-described instruction set.

Specifically, queuing instruction "Write Data with Head and Next Pointers" has the format illustrated in FIG. 7A, and it is issued with the following parameters.

| Parameter | Size (bits) | Meaning |
| --- | --- | --- |
| Opcode | 4 | The opcode for This queuing instruction is 4'b1000 |
| queue | 17 | input flow id (the purpose of this field is for updating the queue occupancy and for byte-level accounting) |
| AAL5 decapsulate | 1 | Indicates if this fragment belongs to an reassembled AAL5 packet that will be decapsulated by the egress interface of the traffic manager |
| CI | 1 | Congestion Indication |
| EOP Indication | 1 | 1'b0 = the fragment is not at end of packet<br>1'b1 = the fragment is at the end of packet |
| Mark Bad (MBAD) | 1 | if set to 1, all the cells of the data will be marked bad |
| Head Pointer | 21 | The location in payload memory where the first cell of the fragment should be written. |
| Next Pointer | 21 | The next pointer of the last cell of the fragment. |
| Pipe | 12 | used to update the pipe occupancy (is don't care if user does not wish to keep pipe occupancy); this parameter is passed back in admission control status |

As noted elsewhere herein, the data of each packet fragment is segmented into cells. The first cell is written into payload memory at location given by parameter Head Pointer. The locations of the remaining cells come from the pointer pool (also referred to as "free buffer cache"). The next pointer field of the last cell is specified by parameter Next Pointer. The EOP field in a database "DB" is updated for every cell. Assume no drops:

| Instruction | Location of first cell | Location of middle cells | Location of last cell | Next pointer of last cell | queue's new tail pointer | queue's new write pointer |
|---|---|---|---|---|---|---|
| Write Data with Head/Next Pointers (multi-cell data) | Head Pointer | from free pointer cache | from free pointer cache | Next Pointer | not applicable | not applicable |
| Write Data with Head/Next Pointers (single cell data) | not applicable | not applicable | Head Pointer | Next Pointer | not applicable | not applicable |

If queue_enable=0, the data is dropped. If queue_enable=1, data could be dropped due to the queue's Dynamic Threshold Group full or WRED Group full. Note that WRED stands for "weighted random early detection," an admission control mechanism well known in the art. Such situation must be prevented since the cell referenced by the Head Pointer must never be dropped. It can be prevented by disabling the queue's dynamic threshold and WRED admission control or by setting the threshold group and WRED group's upper limits to the maximum buffer size of the payload memory so the groups are never full. The cells other than the first cell could be dropped due to lack of free pointers:

| types of drops | consequences |
|---|---|
| first cell is never dropped because Head Pointer is allocated for it | |
| a middle/last cell dropped | Remaining cells are dropped. The next pointer of the last accepted cell equals to the parameter Next Pointer of the queuing instruction. The last accepted cell is marked bad. |

Figure 7B:
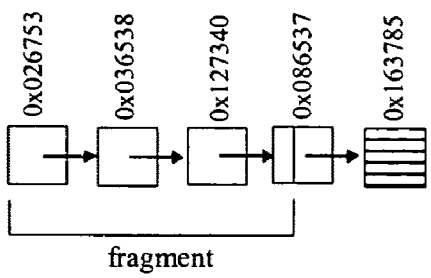
Figure 7B:
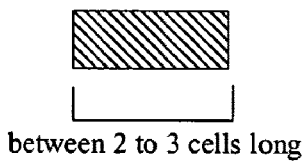
Figure 7B:
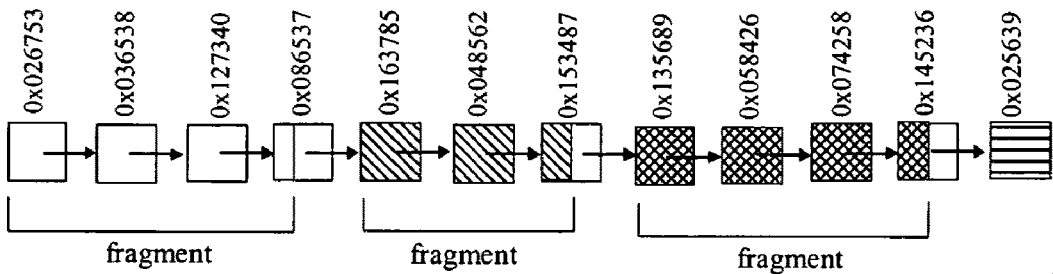

An example of usage of this instruction is illustrated in FIG. 7B. This instruction can be used to write fragments into payload memory in the reassembling scheme where fragments are first written into payload memory then linked Specifically, queuing instruction "Write Data with Head and Tail Pointers" has the format illustrated in FIG. 8A, and it is issued with the following parameters.

| Parameter | Size (bits) | Meaning |
|---|---|---|
| Opcode | 4 | The opcode for This queuing instruction is 4'b1001 |
| queue | 17 | input flow id (the purpose of this field is for updating the queue occupancy and for byte-level accounting) |
| AAL5 decapsulate | 1 | Indicates if this fragment belongs to an reassembled AAL5 packet that will be decapsulated by the egress interface of the traffic manager |
| CI | 1 | Congestion Indication |
| EOP Indication | 1 | 1'b0 = the fragment is not at end of packet 1'b1 = the fragment is at the end of packet |
| Mark Bad (MBAD) | 1 | if set to 1, all the cells of the data will be marked bad |
| Head Pointer | 21 | The location in payload memory where the first cell of the fragment will be written. |
| Tail Pointer | 21 | The location in payload memory where the last cell of the fragment will be written. |
| Pipe | 12 | used to update the pipe occupancy (is don't care if user does not wish to keep pipe occupancy); this parameter is passed back in admission control status |

The fragment is segmented into cells. The first cell is written into payload memory at location given by parameter Head Pointer. The last cell is written at location given by parameter Tail Pointer. If the fragment fits in one payload memory cell, the Head and Tail Pointers must be the same. The locations of the remaining cells come from free pointer cache. The next pointer field of the last cell is null. The EOP DB is updated for every cell. Assume no drops:

| Instruction | Location of first cell | Location of middle cells | Location of last cell | Next pointer of last cell | queue's new tail pointer | queue's new write pointer |
|---|---|---|---|---|---|---|
| Write Data with Head/Tail Pointers (multi-cell data) | Head Pointer | from free pointer cache | Tail Pointer | null | not applicable | not applicable |
| Write Data with Head/Tail Pointers (single cell data) | not applicable | not applicable | Head/Tail Pointer | null | not applicable | not applicable |

If queue is not enabled, the data is dropped. If queue is enabled, data could be dropped due to the queue's Dynamic Threshold Group full or WRED Group full. Such a situation is prevented since the cells referenced by the Head and Tail Pointers must never be dropped. It can be prevented by disabling the queue's dynamic threshold and WRED admission control or by setting the threshold group and WRED group's upper limits to the maximum buffer size of the payload memory so the groups are never full. The cells other than Head and Tail cells could be dropped due to lack of free pointers:

| types of drops | consequences |
|---|---|
| first cell is never dropped because Head Pointer is allocated for it, unless queue is not enabled | |
| a middle cell dropped | Remaining cells are dropped except for the last cell. The last cell will be marked bad. |
| last cell is never dropped because Tail Pointer is allocated for it, unless queue is not enabled | |

Figure 8B:
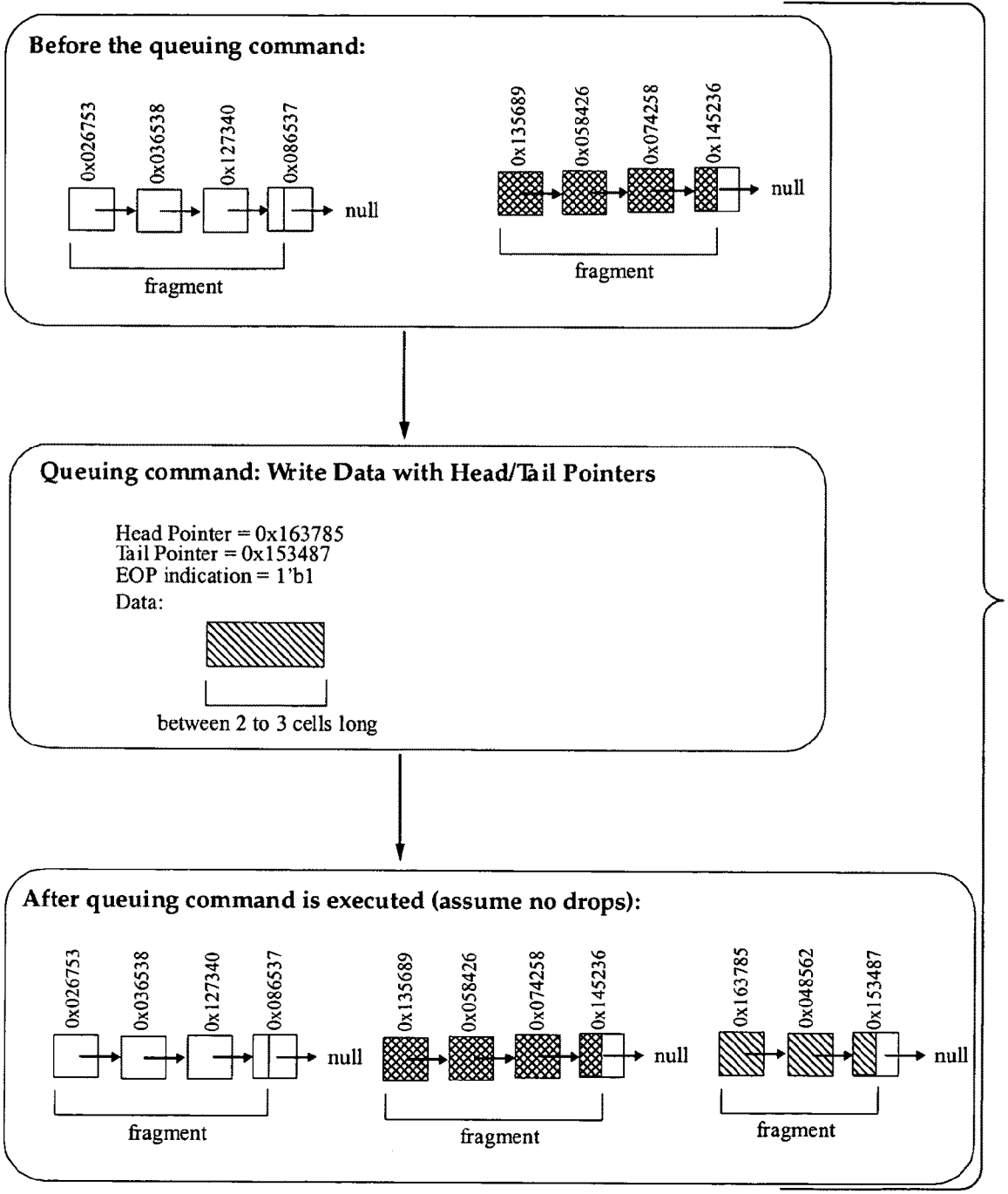
Figure 9A:
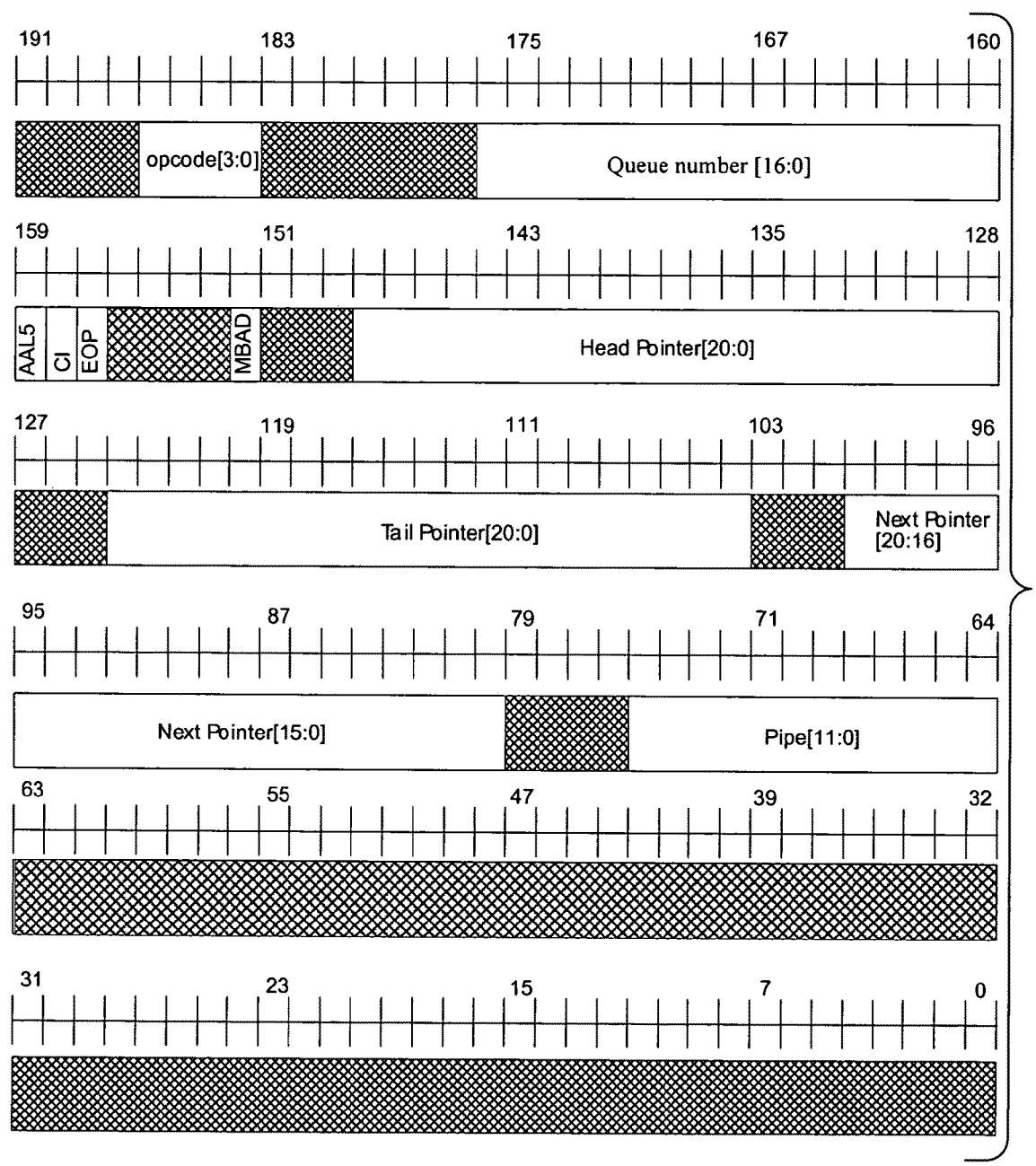
FIGS. 9A and 9B illustrate the format and exemplary use respectively of yet another write instruction in the just-described instruction set.

An example of usage of this instruction is illustrated in FIG. 8B. This instruction can be used to write fragments into payload memory in the reassembling scheme where fragments are first written into payload memory then linked Specifically, queuing instruction "Write Data with Head, Tail and Next Pointers" has the format illustrated in FIG. 9A, and it is issued with the following parameters.

| Parameter | Size (bits) | Meaning |
|---|---|---|
| Opcode | 4 | The opcode for This queuing instruction is 4'b1010 |
| queue | 17 | input flow id (the purpose of this field is for updating the queue occupancy and for byte-level accounting) |
| AAL5 decapsulate | 1 | Indicates if this fragment belongs to an reassembled AAL5 packet that will be decapsulated by the egress interface of the traffic manager |
| CI | 1 | Congestion Indication |
| EOP | 1 | 1'b0 = the fragment is not at end of packet |

| Parameter | Size (bits) | Meaning |
|---|---|---|
| Indication | | 1'b1 = the fragment is at the end of packet |
| Promote Enable (PRMT) | 1 | 1'b0 = disable tail-to-head promotion 1'b1 = enable tail-to-head promotion, TM will overwrite the first 8 bytes of the data with promotion info (nP needs to prepend 8 bytes in front of data) |
| Mark Bad (MBAD) | 1 | if set to 1, all the cells of the data will be marked bad |
| Head Pointer | 21 | The location in payload memory where the first cell of the fragment will be written. |
| Tail Pointer | 21 | The location in payload memory where the last cell of the fragment will be written. |
| Next Pointer | 21 | The next pointer of the last cell of the fragment. |
| Pipe | 12 | used to update the pipe occupancy (is don't care if user does not wish to keep pipe occupancy); this parameter is passed back in admission control status |

As noted above, each packet fragment is segmented into cells. The first cell is written into payload memory at location given by parameter Head Pointer. The last cell is written at location given by parameter Tail Pointer. If the fragment fits in one payload memory cell, the Head and Tail Pointers must be the same. The locations of the remaining cells come from free buffer cache. The next pointer field of the last cell is Next Pointer. The EOP (end-of-packet) DB (database) is updated for every cell. Assume no drops:

| Instruction | Location of first cell | Location of middle cells | Location of last cell | Next pointer of last cell | queue's new tail pointer | queue's new write pointer |
|---|---|---|---|---|---|---|
| Write Data with Head/Tail/Next Pointers (multi-cell data) | Head Pointer | from free pointer cache | Tail Pointer | Next Pointer | not applicable | not applicable |
| Write Data with Head/Tail/Next Pointers (single cell data) | not applicable | not applicable | Tail Pointer | Next Pointer | not applicable | not applicable |

If queue is not enabled, then the data in the packet fragment is dropped. If queue is enabled, the data could be dropped due to the queue's Dynamic Threshold Group full or WRED Group full. Such situation must be prevented since the cell referenced by the Head and Tail Pointers must never be dropped. It can be prevented by disabling the queue's dynamic threshold and WRED admission control or by setting the threshold group and WRED group's upper limits to the maximum buffer size of the payload memory so the groups are never full. Still, the cells other than Head and Tail cells could be dropped due to lack of free pointers:

| types of drops | consequences |
|---|---|
| first cell is never dropped because Head Pointer is | |

-continued

| types of drops | consequences |
| --- | --- |
| allocated for it, unless queue is not enabled a middle cell is dropped | Remaining cells are dropped except for the last cell. The last cell will be marked bad. |
| last cell is never dropped because Tail Pointer is allocated for it, unless queue is not enabled | |

Figure 9B:
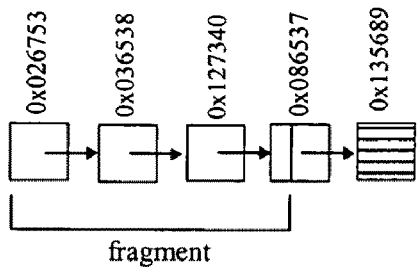
Figure 9B:
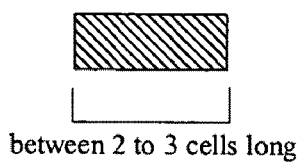
Figure 9B:
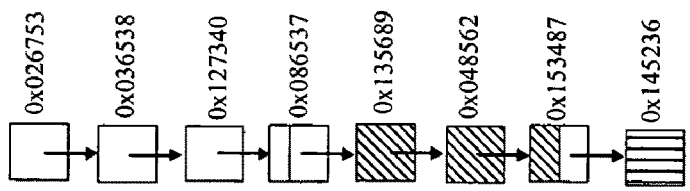

An example of usage of this instruction is illustrated in FIG. 9B. This instruction can be used to write the fragment containing the end of packet into payload memory in the reassembling scheme where fragments are first assembled in payload memory then linked to queue.

Figure 10A:
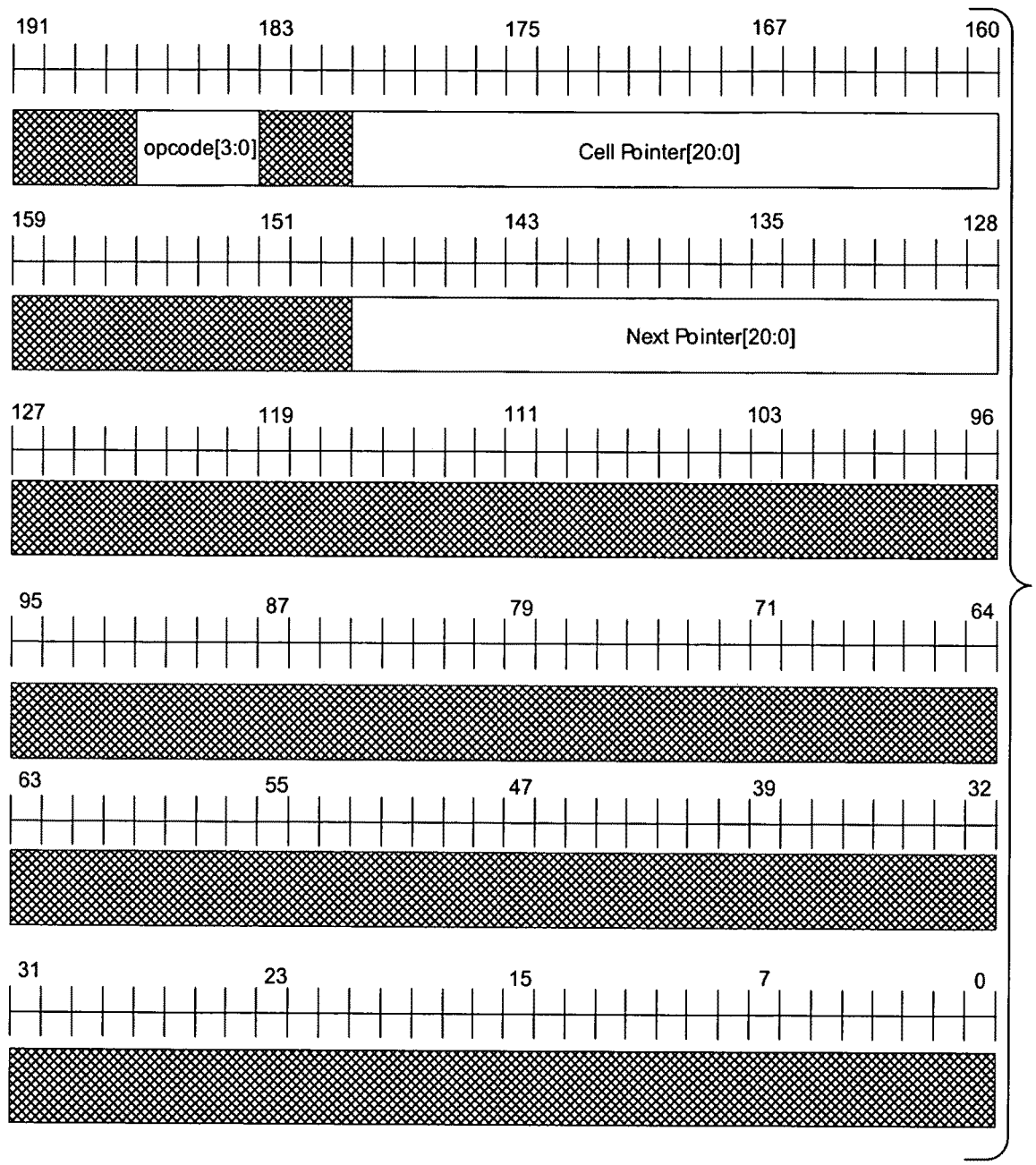
FIGS. 10A and 10B illustrate the format and exemplary use respectively of a stitch instruction in the just-described instruction set.

Specifically, queuing instruction "Modify Next Cell Pointer" has the format illustrated in FIG. 10A, and it is issued with the following parameters.

| Parameter | Size (bits) | Meaning |
| --- | --- | --- |
| Opcode | 4 | The opcode for This queuing instruction is 4'b1100 |
| Cell Pointer | 21 | Specifies the location of the cell whose next pointer will be overwritten |
| Next Pointer | 21 | The new next pointer |

Figure 10B:
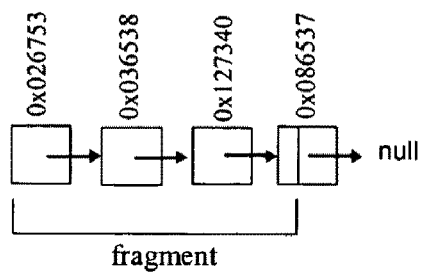
Figure 10B:
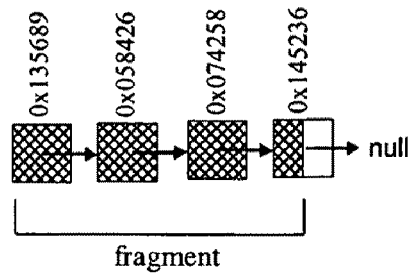
Figure 10B:
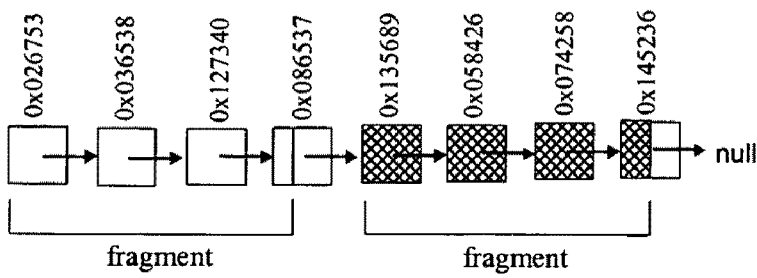

The next pointer of the cell (located at location specified by Cell Pointer) is overwritten with the parameter Next Pointer of the queuing instruction, effectively linking two cells. The cell whose next pointer is being modified must not be linked to queue yet. An example of usage of this instruction is illustrated in FIG. 10B. This instruction can be used to link fragments in payload memory in the reassembly scheme where fragments are first written into payload memory, then linked.

The foregoing description is presented to enable one to make and use the invention, and is provided in the context of particular applications and their requirements. It is not intended to be exhaustive or to limit the invention to the forms disclosed. Various modifications to the disclosed embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. Accordingly, many modifications and variations will be apparent to the skilled artisan in view of the disclosure.

For example, although a traffic manager of some embodiments is described as being instructed to store each unit of data in the memory without linking the unit of data to a queue, other embodiments of the traffic manager can be instructed (by an additional write instruction) to store and link (in a single unitary operation) each unit of data in the memory for use in efficient storage of data units that arrive in order. For this reason, many embodiments of the traffic manager support two kinds of instructions: (a) write instruction which stores a data unit but without linking to a queue and (b) an additional write instruction which links the a data unit to a queue at the time of storage.

Moreover, although in some embodiments the three instructions: (a) write, (b) stitch and (c) link are supported, other embodiments may support specific combinations of such instructions as a single instruction. Specifically, several alternative embodiments support explicit stitching wherein two instructions of the type described above are combined into a single instruction. For example, a first alternative embodiment has an instruction set with a write instruction and a combined stitch-and-link instruction whereas a second alternative embodiment has another instruction set with a link instruction and a combined write-and-stitch instruction.

Furthermore, as noted above in reference to FIGS. 3D, 3E and 3H, several embodiments do not use a stitch instruction at all. Instead, in such embodiments, just two instructions, namely a write instruction and a link instruction are sufficient to form a queuing instruction set of the type described herein. In an example of the scheme illustrated in FIGS. 3D and 3E, when a number N fragments are received, they are stitched on the fly during execution of the write instruction itself, and at the end a single link instruction is sufficient to couple the existing packet data to the queue. In another example of the scheme illustrated in FIG. 3H, the N fragments are each individually written to memory without being ordered in sequence until the end at which time N link instructions are issued to link each fragment one at a time to the queue in the appropriate order.

Numerous such modifications and adaptations of the embodiments and variants described herein are encompassed by the appended claims.

What is claimed is:

1. A device comprising:
 a scheduler configured to schedule queues of data in a payload memory, based on at least one of: priority, rate and bandwidth guarantee; and
 an execution unit comprising decode logic configured to decode instructions from an instruction set; wherein the instruction set comprises:
  a first operation code to write data to the payload memory but not link the data to a queue; and
  a second operation code, different than the first operation code, to link the data held in payload memory to the queue.

2. The device of claim 1 wherein:
 the execution unit comprises a pipeline, the decode logic is included in an early stage of the pipeline, and the memory bus is coupled to a last stage of the pipeline; and
 the execution unit further comprises a first-in-first-out memory coupled to an input bus of the pipeline.

3. The device of claim 1 further comprising:
 an input bus coupled to the execution unit to supply thereto the data and the instructions; and
 a network processor coupled to the input bus, the network processor comprising a processing unit programmed to identify a queue number and generate at least one instruction for each unit of data to be transmitted on the input bus, the processing unit in the network processor comprising another decode logic different from said decode logic of the execution unit;
 wherein the execution unit and the scheduler are included in a traffic manager, the traffic manager being coupled to the network processor by the input bus.

4. The device of claim 3 wherein the traffic manager further comprises a pointer pool, said pointer pool being coupled to each of said network processor and said execution unit.

5. The device of claim 1 wherein the instruction set further comprises yet another instruction to set up a sequence in which the data is read from the payload memory but without moving the data in payload memory.

6. A method for forming queues in a memory, the method comprising:
receiving a write instruction, a queue number, and a unit of data from a bus;
decoding the write instruction;
executing the write instruction, by storing the unit of data in the memory without linking the unit of data to the queue;
receiving a stitch instruction;
decoding the stitch instruction;
executing the stitch instruction, by changing at least one pointer in the memory;
receiving a link instruction;
decoding the link instruction; and
executing the link instruction, by coupling the units of data of the packet to the queue.

7. The method of claim 6 wherein said receiving, decoding, executing and repeating are performed in a first circuit, the first circuit being coupled by the bus to a second circuit, and the method further comprises the second circuit:
receiving the unit of data and a header from another bus;
analyzing the header to identify the queue number;
creating the write instruction;
sending the unit of data, the queue number, and the write instruction to the first circuit; and
repeating said receiving, analyzing, creating and sending until all units of data of a packet are received and thereafter creating and sending the stitch instruction and the link instruction to the first circuit.

8. The method of claim 6 further comprising:
receiving an additional write instruction from said bus;
decoding the additional write instruction; and
storing the unit of data in the memory and linking the unit of data to the queue, during execution of the additional write instruction.

* * * * *